United States Patent
Ono et al.

(10) Patent No.: US 6,722,572 B2
(45) Date of Patent: Apr. 20, 2004

(54) RECORDING MEDIUM CONTROL METHOD, DATA MANAGEMENT APPARATUS, AND RECORDING MEDIUM

(75) Inventors: Akiko Ono, Zama (JP); Hisayuki Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 10/153,644

(22) Filed: May 24, 2002

(65) Prior Publication Data

US 2002/0139860 A1 Oct. 3, 2002

Related U.S. Application Data

(63) Continuation of application No. PCT/JP99/06736, filed on Dec. 1, 1999.

(51) Int. Cl.[7] .............................................. G06K 19/06
(52) U.S. Cl. ..................................... 235/492; 235/380
(58) Field of Search ................................ 235/380, 379, 235/492, 487, 384, 382, 382.5; 705/41, 42, 43, 44

(56) References Cited

U.S. PATENT DOCUMENTS

| | | | |
|---|---|---|---|
| 4,849,614 A | * 7/1989 | Watanabe et al. | ............ 235/379 |
| 5,193,162 A | * 3/1993 | Bordsen et al. | ............. 711/152 |
| 6,253,999 B1 | 7/2001 | Yamamoto et al. | ......... 235/380 |
| 6,280,325 B1 | * 8/2001 | Fisk | .............. 463/19 |
| 6,564,104 B2 | * 5/2003 | Nelson et al. | ................. 607/60 |
| 6,609,659 B2 | * 8/2003 | Sehr | .............................. 235/384 |
| 2002/0052843 A1 | * 5/2002 | Canon | ......................... 705/41 |
| 2002/0139860 A1 | * 10/2002 | Ono et al. | .................. 235/487 |

FOREIGN PATENT DOCUMENTS

| | | |
|---|---|---|
| JP | 58-70495 | 4/1983 |
| JP | 62-242287 | 10/1987 |
| JP | 2-173849 | 7/1990 |
| JP | 4-287143 | 10/1992 |
| JP | 6-162285 | 6/1994 |
| JP | 7-121449 | 5/1995 |
| JP | 8-115257 | 5/1996 |
| JP | 8-115390 | 5/1996 |
| JP | 10-269301 | 10/1998 |
| JP | 11-110510 | 4/1999 |
| JP | 11-167599 | 6/1999 |
| JP | 11-353238 | 12/1999 |
| JP | 2000-29966 | 1/2000 |

* cited by examiner

*Primary Examiner*—Thien M. Le
(74) *Attorney, Agent, or Firm*—Armstrong, Kratz, Quintos, Hanson & Brooks, LLP

(57) ABSTRACT

The present invention has an object of providing a recording medium control method, a data management apparatus, and a recording medium for managing data by duplicating the data in each of a plurality of recording media. Two IC cards are loaded into a data management apparatus. In duplicating data in the two loaded IC cards, the two IC cards store their card characteristic numbers for self-identification and the card characteristic number of each other's pair IC card. If the card characteristic number of the pair IC card stored in one IC card matches the card characteristic number of the other IC card, the two IC cards are controllable.

14 Claims, 29 Drawing Sheets

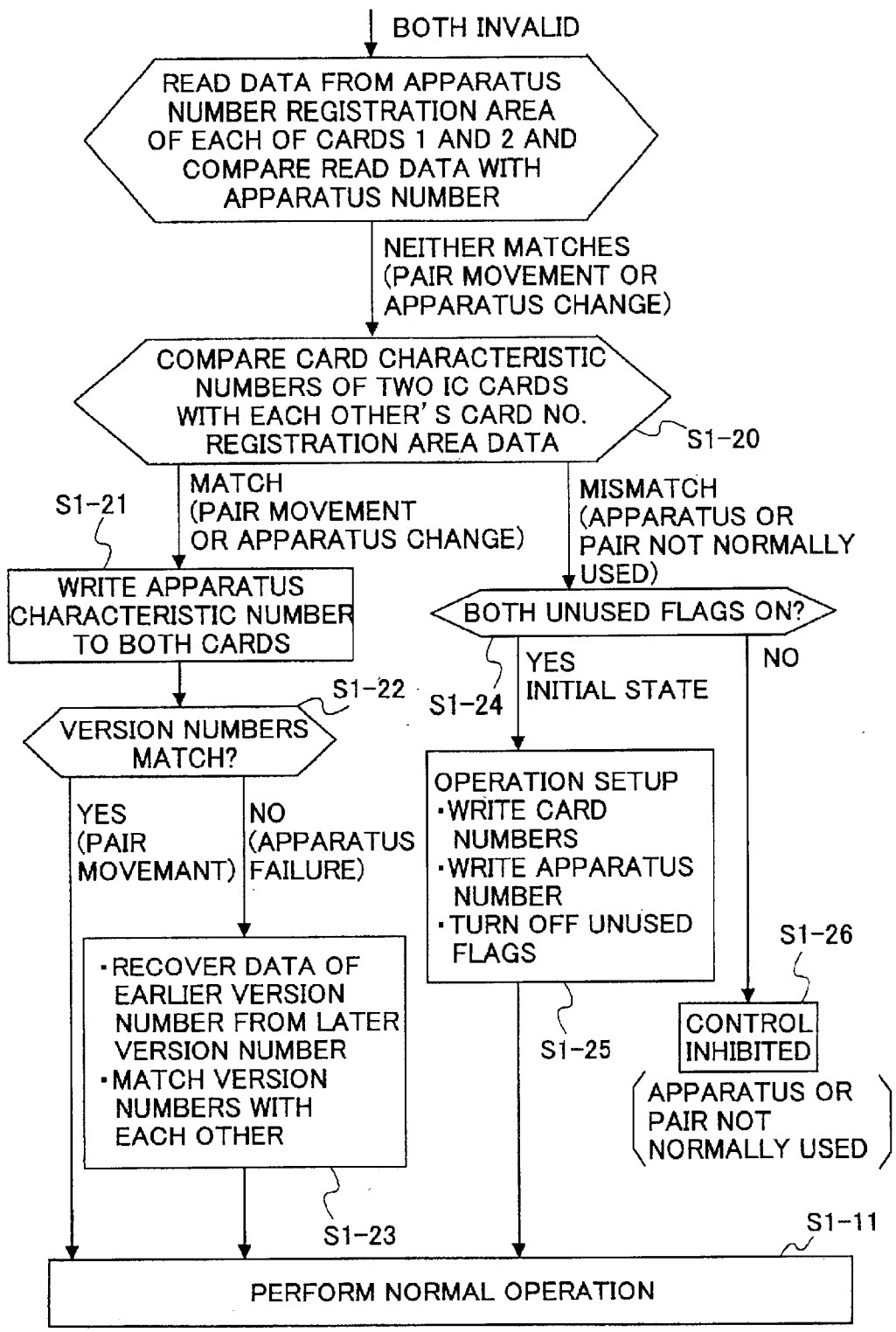

FIG.17

| COMMAND | TRANSMISSION | | RESPONSE | |
|---|---|---|---|---|
| | COMMAND TYPE | DATA | REPLY | DATA |
| READ COMMAND | CARD CHARACTERISTIC NO. AREA READ | NONE | ⇦ | CARD CHARACTERISTIC NO. DATA |
| | CARD NO. REGISTRATION AREA READ | | ⇦ | CARD NO. REGISTRATION DATA |
| | APPARATUS NO. REGISTRATION AREA READ | | ⇦ | APPARATUS NO. REGISTRATION DATA |
| | VERSION NO. MANAGEMENT AREA READ | | ⇦ | VERSION NO. MANAGEMENT DATA |
| | PAIR FAILURE FLAG AREA READ | | ⇦ | PAIR FAILURE FLAG DATA |
| | UNUSED FLAG AREA READ | | ⇦ | UNUSED FLAG DATA |
| | INVALID FLAG AREA READ | | ⇦ | INVALID FLAG DATA |
| | VALUE DATA AREA READ | | ⇦ | VALUE DATA |
| | TRANSACTION HISTORY AREA READ | | ⇦ | TRANSACTION HISTORY DATA |
| | CHECKSUM DATA AREA READ | | ⇦ | CHECKSUM DATA |
| | MEMORY READ | ADDRESS/LENGTH | ⇦ | MEMORY DATA (LENGTH) |
| | CPU REGISTER READ | REGISTER NAME | ⇦ | REGISTER DATA |
| WRITE COMMAND | CARD NO. REGISTRATION AREA WRITE | CARD CHARACTERISTIC NO. | ⇦ | NORMAL WRITE OR ABNORMAL END |
| | APPARATUS NO. REGISTRATION AREA WRITE | APPARATUS NO. | ⇦ | NORMAL WRITE OR ABNORMAL END |
| | VERSION NO. MANAGEMENT AREA WRITE | VERSION INFORMATION | ⇦ | NORMAL WRITE OR ABNORMAL END |
| | PAIR FAILURE FLAG AREA WRITE | FAILURE FLAG | ⇦ | NORMAL WRITE OR ABNORMAL END |
| | UNUSED FLAG AREA WRITE | UNUSED FLAG | ⇦ | NORMAL WRITE OR ABNORMAL END |
| | INVALID FLAG AREA WRITE | INVALID FLAG | ⇦ | NORMAL WRITE OR ABNORMAL END |
| | VALUE DATA AREA WRITE | VALUE DATA | ⇦ | NORMAL WRITE OR ABNORMAL END |
| | TRANSACTION HISTORY AREA WRITE | TRANSACTION HISTORY DATA | ⇦ | NORMAL WRITE OR ABNORMAL END |
| | CHECKSUM DATA AREA WRITE | CHECKSUM DATA | ⇦ | NORMAL WRITE OR ABNORMAL END |
| | MEMORY WRITE | ADDRESS/DATA | ⇦ | NORMAL WRITE OR ABNORMAL END |
| | CPU REGISTER WRITE | REGISTER NAME/DATA | ⇦ | NORMAL WRITE OR ABNORMAL END |
| | ACTIVITY CHECK | NONE | ⇦ | NORMAL WRITE OR ABNORMAL END |

RECORDING MEDIUM CONTROL METHOD, DATA MANAGEMENT APPARATUS, AND RECORDING MEDIUM

This application is a continuation of international application PCT/JP99/06736 filed on Dec. 1, 1999.

TECHNICAL FIELD

The present invention relates to recording medium control methods, data management apparatuses, and recording media, and more particularly to a recording medium control method, a data management apparatus, and a recording medium for data management by duplicating data in each of a plurality of recording media.

Commercial transactions using electronic money have been conducted of late. For the commercial transactions using electric money, management apparatuses employing IC cards as storage devices for receiving and transferring value data such as electronic money have been developed. Normally, an IC card employed in such management apparatuses is provided with a unique IC chip having a particular authentication function. Such an IC card is allowed to exchange data only with an IC card or an apparatus having the same IC chip, thereby increasing the reliability of the data.

However, the reliability of the data is insufficient since the data is still exchangeable between the IC cards or the IC card and the apparatus having the same IC chip. Therefore, there have been demands for further increasing the data reliability.

BACKGROUND ART

FIG. 1 is a block diagram showing a conventional example.

IC cards 2-1 through 2-n are attached to an electronic money management apparatus 1. The electronic money management apparatus 1 is connected via a network 3 to a terminal device 4.

The electronic money management apparatus 1 stores value data such as electronic money in the IC cards 2-1 through 2-n, and exchanges the value data such as electronic money with the terminal device 4 via the network 3.

The electronic money management apparatus 1 is composed of communication parts 5 and 6, a nonvolatile memory 7, a CPU 8, and connection terminals 9-1 through 9-n. The communication part 5 controls communication with the network 3. The communication part 6 controls communication with the IC cards 2-1 through 2-n.

The nonvolatile memory 7 stores an apparatus characteristic number characteristic of the electronic money management apparatus 1. The CPU 8 obtains value data to be stored in the IC cards 2-1 through 2-n in accordance with the exchange of the value data, and stores the obtained value data in the IC cards 2-1 through 2-n. The connection terminals 9-1 through 9-n are connected to the IC cards 2-1 through 2-n, respectively.

Each of the IC cards 2-1 through 2-n is composed of an external terminal 10 and an IC chip 11. The external terminal 10 is connected to one of the connection terminals 9-1 through 9-n of the electronic money management apparatus 1 so as to connect the IC chip 11 with the electronic money management apparatus 1.

The IC chip 11 is composed of communication part 12, a CPU 13, a nonvolatile memory 14, and a volatile memory 15. The communication part 12 controls communication with the electronic money management apparatus 1.

The CPU 13 controls writing the value data to and reading the value data from the nonvolatile memory 14 in accordance with a program stored in the nonvolatile memory 14. The nonvolatile memory 14 includes an EEPROM and stores the value data and the program executed by the CPU 13. The volatile memory 15 is used as a working storage for processing by the CPU 13. For instance, program control data is loaded thereinto from the nonvolatile memory 14.

In the conventional electronic money management apparatus 1, no value data stored in the IC cards 2-1 through 2-n are duplicated.

Therefore, if the IC cards 2-1 through 2-n are extracted from the electronic money management apparatus 1 or otherwise damaged, the value data of the extracted or damaged IC cards 2-1 through 2-n are lost, so that services cannot be provided.

If value data is to be duplicated in the same IC card in the case of making a duplicate of the value data, no value data can be read out when the IC card is extracted or damaged. Therefore, there is no meaning in duplicating the value data. Accordingly, in the case of duplicating the value data, it is necessary to make a duplicate in a different IC card. In the case of duplicating the value data in a different IC card, the value data is preserved by the different IC card even if the original IC card is lost or damaged.

However, once the IC card is duplicated, a false IC card may be issued based on a false claim that either one of the IC cards is damaged. Further, there is a problem in that when a duplicate of the IC card is made by using an IC card that is a duplicate of another IC card, the value data already stored in the IC card for backup may be deleted mistakenly by a wrong operation of an operator.

The conventional electronic money management apparatus 1 employs the IC cards 2-1 through 2-n for managing the value data. Each of the IC cards uses the EEPROM for retaining the value data. The number of times writing is performed to the EEPROM is physically limited.

Therefore, if the number of times writing is performed to a certain region of the EEPROM increases, use of the other regions of the EEPROM with a smaller number of write operations is limited by the life of the region with a larger number of write operations, thus causing the problem of inefficiency.

The present invention is made in view of the above-described points, and an object of the present invention is to provide a recording medium control method, a data management apparatus, and a recording medium with high reliability.

DISCLOSURE OF THE INVENTION

The above object of the present invention is achieved by a recording medium control method for controlling access to a plurality of recording media each storing duplicated data, wherein each of the recording media stores identification information for identifying which of the recording media stores the duplicated data, it is determined whether the data of the recording media are consistent with each other based on the identification information, the access to the recording media is enabled if it is determined that the data of the recording media are consistent with each other, and the access to the recording media is inhibited if it is determined that the data of the recording media are inconsistent with each other.

Further, according to the present invention, each of the recording media may store, as the identification information, first identification information for self-identification and second identification information for identifying another of the recording media, and it may be determined that there is data consistency between one of the recording media and the rest of the recording media if the first identification information of the one of the recording media exists as the second identification information in the rest of the recording media.

Further, according to the present invention, each of the recording media may store third identification information for identifying an apparatus in which the recording media are loaded, and the apparatus is enabled to control the recording media when the third identification information matches identification information of the apparatus.

The above object of the present invention is also achieved by a data management apparatus loaded with a plurality of recording media each storing duplicated data and controlling access to the loaded recording media, the data management apparatus including an access control part determining whether the duplicated data of the recording media are consistent with each other and controlling the access to the recording media based on a result of the determination, wherein each of the recording media stores identification information for identifying which of the recording media stores the duplicated data, the access control part makes the determination based on the identification information, and the access control part enables the access to the recording media if said access control part determines that the data of the recording media are consistent with each other and inhibits the access to the recording media if said access control part determines that the data of the recording media are inconsistent with each other.

Further, according to the present invention, each of the recording media may store, as the identification information, first identification information for self-identification and second identification information for identifying another of the recording media, and the access control part may determine that there is data consistency between one of the recording media and the rest of the recording media if the first identification information of the one of the recording media exists as the second identification information in the rest of the recording media.

Further, according to the present invention, each of the recording media may store third identification information for identifying the data management apparatus in which the recording media are loaded, and the access control part enables the data management apparatus to control the recording media when the third identification information matches identification information of the data management apparatus.

Further, according to the present invention, each of the recording media may store version information updated every time the data thereof is updated, and the access control part may record the data of a first one of the recording media on a second one of the recording media so as to set the first and second recording media controllable if the version information of the first and second recording media are different from each other, the version information of the first recording medium being updated more times than that of the second recording medium.

Further, the data management apparatus according to the present invention may further include a version number update part updating the version information of each of the recording media when the recording media are removed from the data management apparatus in which the recording media are loaded.

Further, according to the present invention, each of the recording media may store determination information for determining whether the recording medium is independently controllable, and the access control part may recognize the determination information of each of the recording media if the access control part determines that there is no data consistency between the recording media, and set one of the recording media controllable if the determination information of the one of the recording media shows that the one of the recording media is independently controllable.

Further, according to the present invention, each of the recording media may store determination information for determining whether the recording medium is in use, and the access control part may inhibit the access to the recording media if the determination information shows that at least one of the recording media is in use, and sets the recording media usable if the determination information shows that all of the recording media are unused.

Further, according to the present invention, each of the recording media may store determination information for determining whether the data recorded on the recording medium is valid or invalid, and the access control part may inhibit the access to the recording media if the determination information of one of the recording media shows that the data recorded thereon is invalid.

Further, according to the present invention, each of the recording media may have the data stored divided into a plurality of data blocks, and store data identification information for identifying divided pieces of the data with corresponding data block identification information for identifying the data blocks storing the divided pieces of the data, and the access control part may recognize the data block identification information based on the data identification information and makes accessible one of the data blocks which one stores a required one of the divided pieces of the data based on the data block identification information.

Further, the data management apparatus according to the present invention may further include a monitoring part monitoring an abnormality in each of the recording media storing abnormal information indicating whether another of the recording media has the abnormality, and an information recording part recording information indicating occurrence of the abnormality in one of the recording media on the rest of the recording media as the abnormal information if the abnormality in the one of the recording media is detected.

The above object of the present invention is further achieved by a recording medium for recording data including a plurality of data blocks for recording the data, the data blocks each including a data recording part recording a number of times the data is updated as number management information, and a recording control part moving the data stored in the data block to a next available one of the data blocks if the number management information reaches a preset given number of times.

BRIEF DESCRIPTION OF THE DRAWINGS

FIGS. 4A through 4D are flowcharts of a duplicate cards authentication operation according to the first embodiment of the present invention;

FIG. 17 is a diagram for illustrating commands transmitted from the electronic money management apparatus to the IC card according to the first embodiment of the present invention;

BEST MODE FOR CARRYING OUT THE INVENTION

Figure 1:
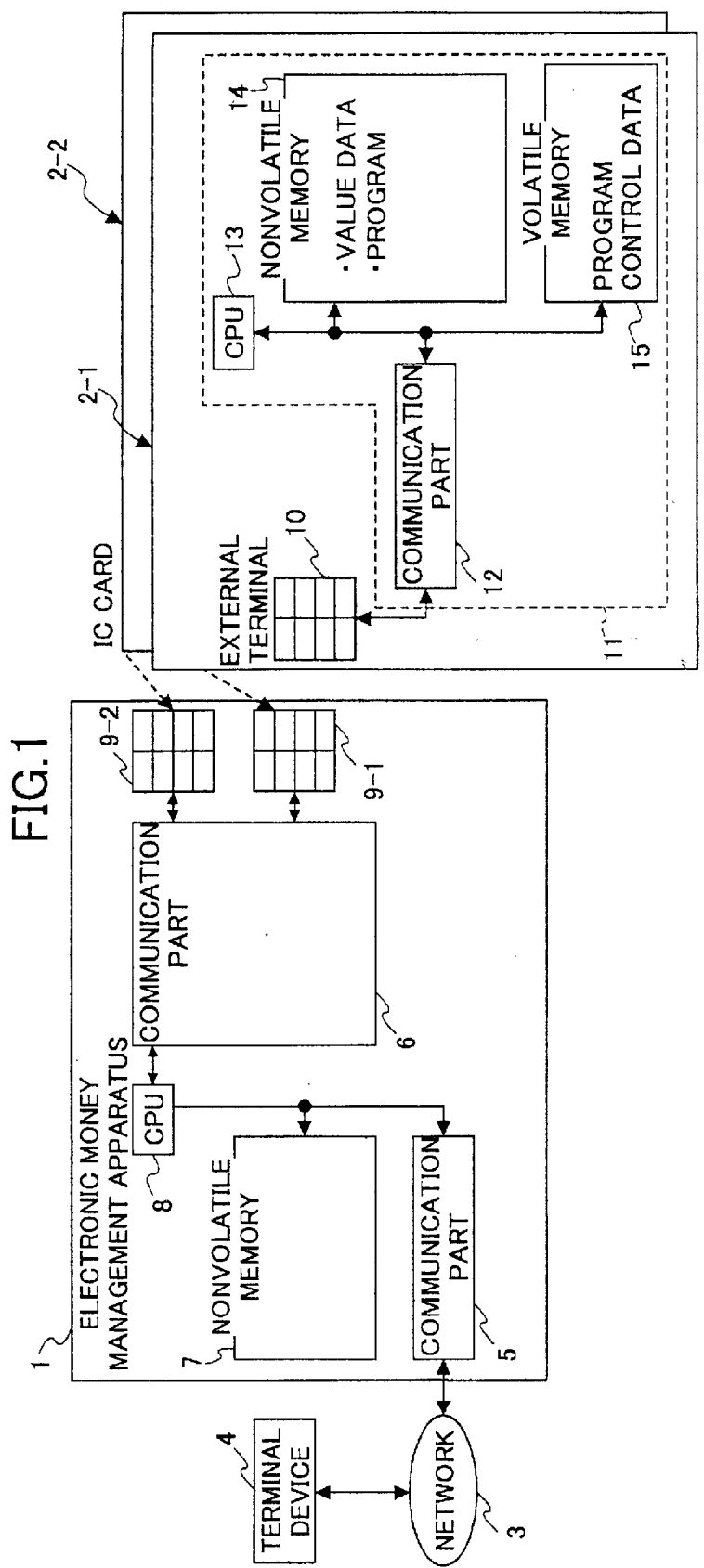
FIG. 1 is a block diagram showing a conventional example.
Figure 2:
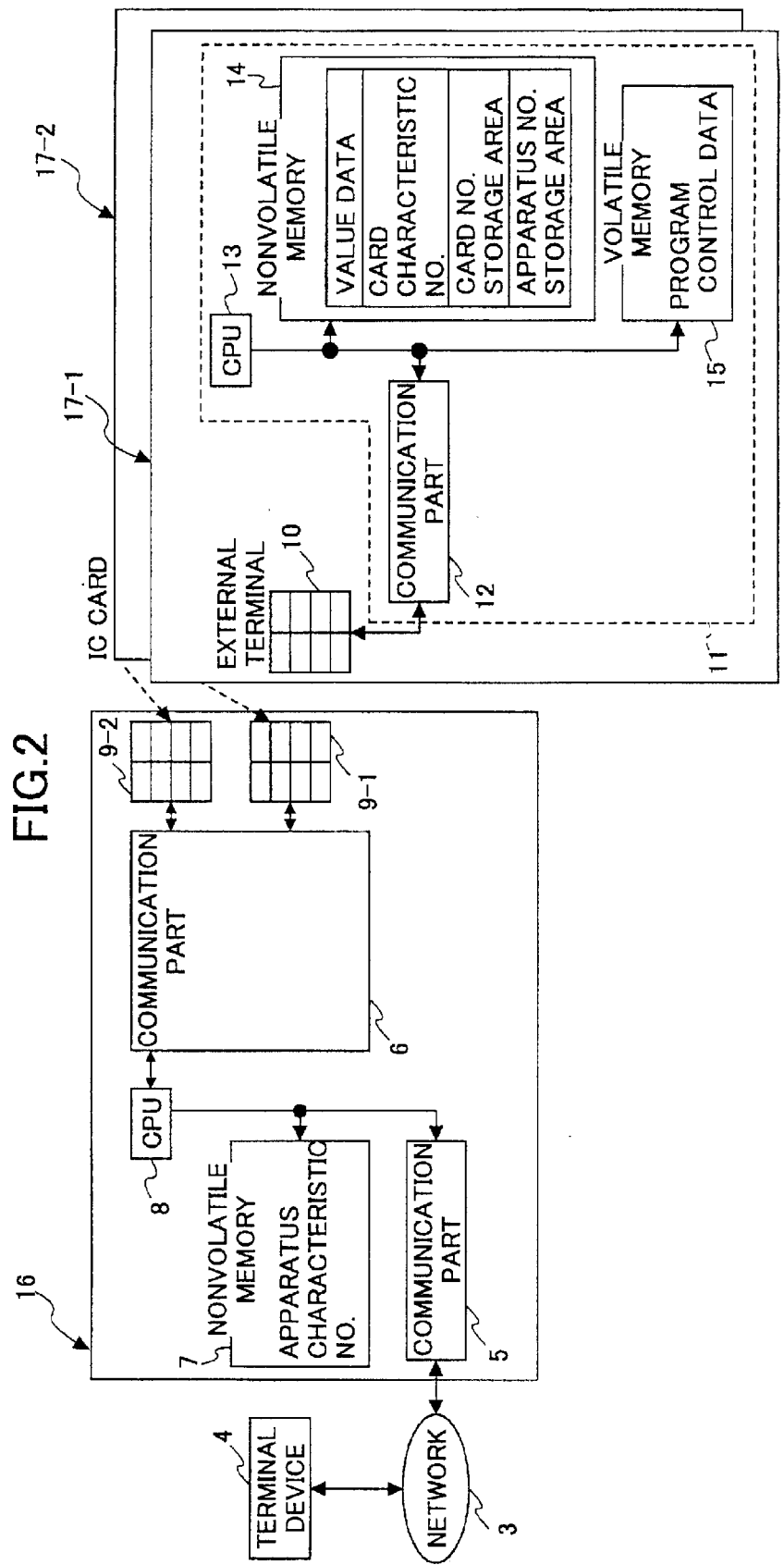
FIG. 2 is a block diagram showing a first embodiment of the present invention.

FIG. 2 is a block diagram showing a first embodiment of the present invention. In FIG. 2, the same elements as those of FIG. 1 are referred to by the same numerals, and a description thereof will be omitted.

In this embodiment, the operations of an electronic money management apparatus 16 and IC cards 17-1 and 17-2 and data configuration are different from the operations of the electronic money management apparatus 1 and the IC cards 2-1 and 2-2 and the data configuration of FIG. 1.

External terminals 10 of the paired IC cards 17-1 and 17-2 are connected to the connection terminals 9-1 and 9-2, respectively, of the electronic money management apparatus 16.

The electronic money management apparatus 16 controls the data of the IC cards 17-1 and 17-2 based on a control program stored in the built-in nonvolatile memory 7. Further, the electronic money management apparatus 16 has apparatus identification information (an apparatus number) for identifying the apparatus stored in the built-in nonvolatile memory 7. The IC cards 17-1 and 17-2 store the same value data. That is, the data is duplicated in the IC cards 17-1 and 17-2.

Figure 3:
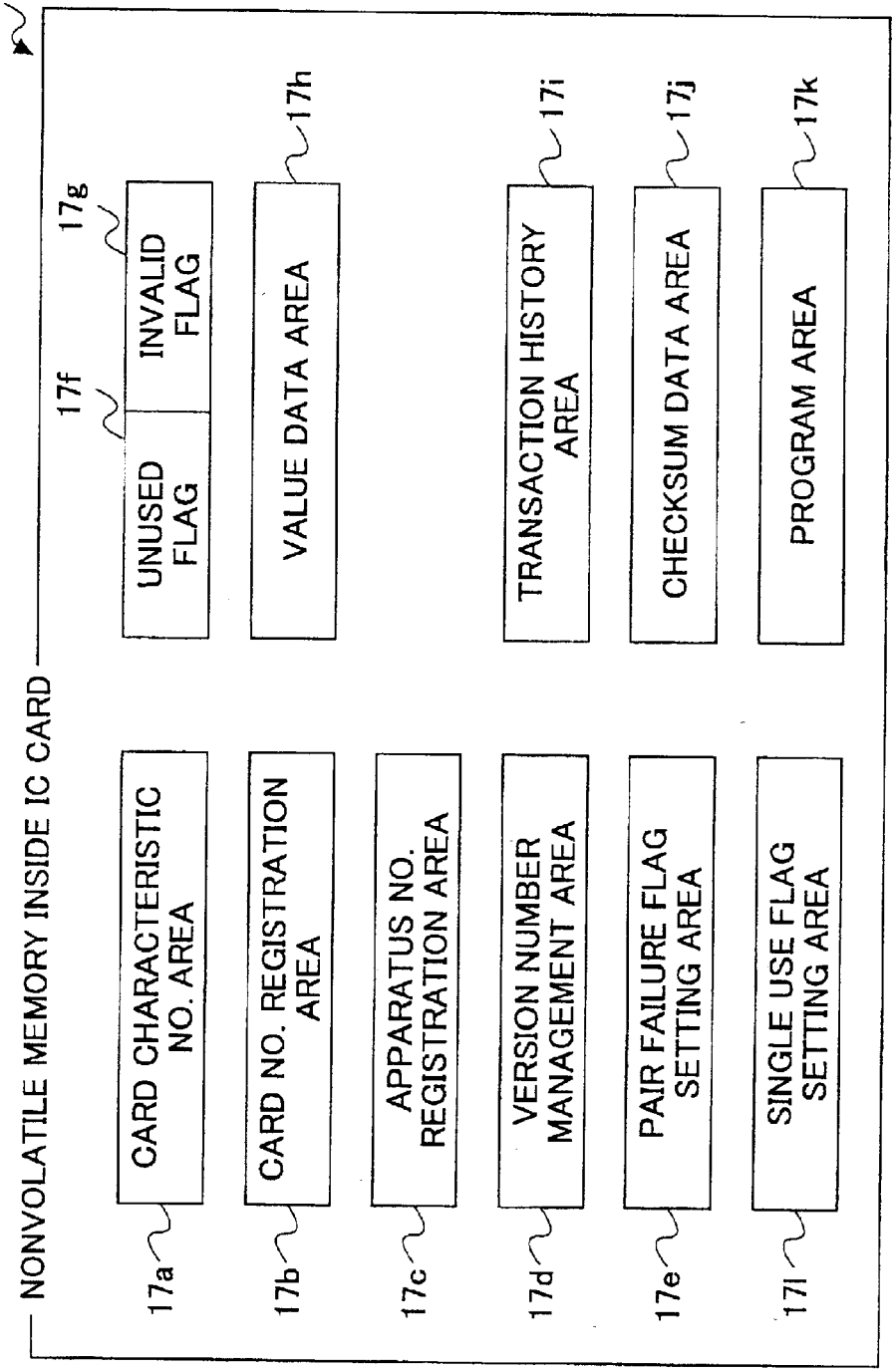
FIG. 3 is a diagram showing a data configuration of a nonvolatile memory of an IC card according to the first embodiment of the present invention.

FIG. 3 is a diagram showing data configuration of the nonvolatile memory 14 of the IC card of the first embodiment of the present invention.

The nonvolatile memory 14 of each of the IC cards 17-1 and 17-2 is composed of a card characteristic number area 17a, a card number registration area 17b, an apparatus number registration area 17c, a version number management area 17d, a pair failure flag area 17e, an UNUSED flag area 17f, an INVALID flag area 17g, a value data area 17h, a transaction history area 17i, a checksum data area 17j, a program area 17k, and a single use flag setting area 17l.

The card characteristic number area 17a stores an IC card characteristic number assigned to and characteristic of each IC card. The IC card characteristic number is identification information for identifying each IC card. The card number registration area 17b stores the IC card characteristic number of an IC card paired with the IC card (a pair IC card). The apparatus number registration area 17c stores an apparatus number. The apparatus number is the identification information for identifying the electronic money management apparatus 16.

The version number management area 17d stores version number information. The version number information shows the version number of the value data stored in the value data area 17h. The pair failure flag area 17e stores a flag indicating whether the pair IC card had any failure in the past. The UNUSED flag area 17f stores a flag indicating whether the IC card is unused or in use. The INVALID flag area 17g stores a flag indicating whether the contents of the IC card is valid or invalid.

The value data area 17h stores the value data. The value data, which is money information, for instance, can be updated based on transactions. The transaction history area 17i stores information on the history of receiving and transferring the value data. The checksum data area 17j stores checksum data for checking correctness of all the IC card data. The program area 17k stores the program controlling the CPU 13. The single use flag setting area 17l stores a flag determining whether to authorize single use of the IC card when data duplication cannot be performed with another IC card.

The card characteristic number area 17a, the card number registration area 17b, the apparatus number registration area 17c, the version number management area 17d, the pair failure flag area 17e, the UNUSED flag area 17f, the INVALID flag area 17g, the value data area 17h, the transaction history area 17i, the checksum data area 17j, the program area 17k, and the single use flag setting area 17l of the nonvolatile memory 14 are all duplicated.

Next, a detailed description will be given of an operation according to a method of authenticating duplicate cards which method is executed when the electronic money management apparatus 16 is started.

FIGS. 4A through 4D are flowcharts of the duplicate cards authentication operation according to the first embodiment of the present invention.

Figure 4A:
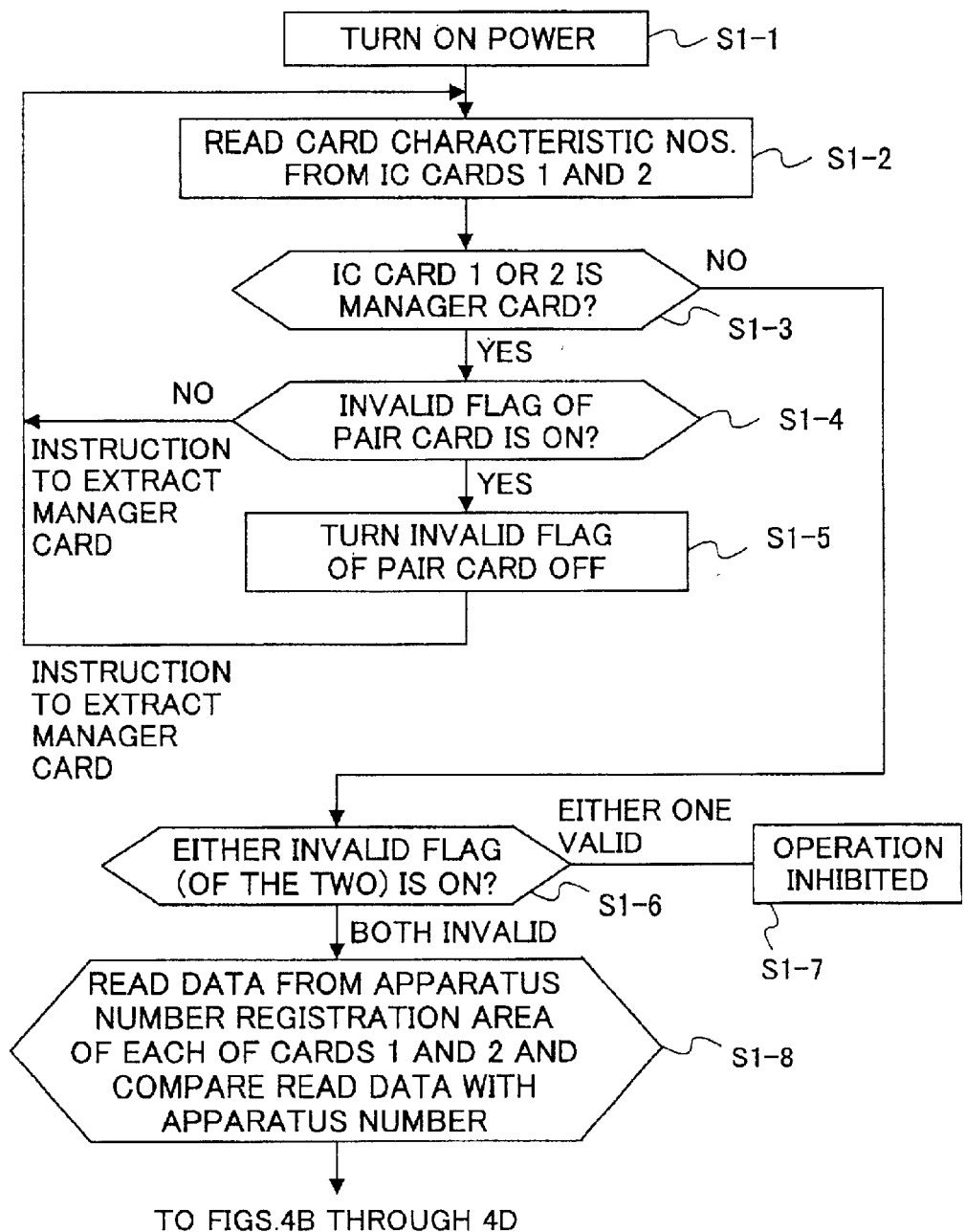

In step S1-1 of FIG. 4A, the IC cards 17-1 and 17-2 are loaded into the electronic money management apparatus 16 and the electronic money management apparatus 16 is turned on. When the IC cards 17-1 and 17-2 are loaded into the electronic money management apparatus 16 and the electronic money management apparatus 16 is turned on in step S1-1, the IC cards 17-1 and 17-2 are also turned on so that the control programs are started, and the correctness of the data is checked in each of the IC cards 17-1 and 17-2.

Figure 5:
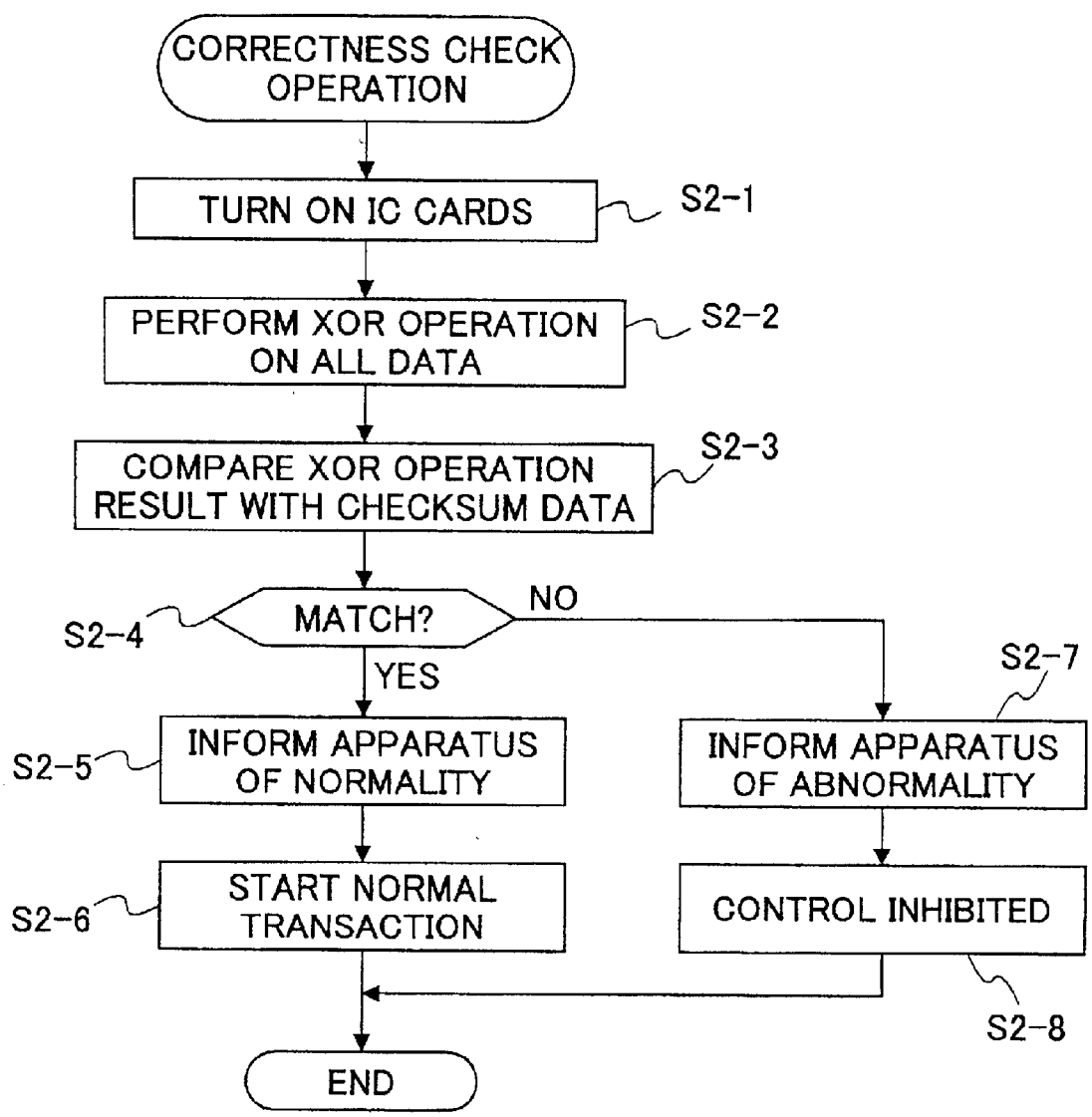
FIG. 5 is a flowchart of an operation of checking correctness of data of the IC card according to the first embodiment of the present invention.

FIG. 5 is a flowchart of an operation of checking the correctness of the data of each IC card of the first embodiment of the present invention.

After the electronic money management apparatus 16 is turned on, in step S2-1, the loaded IC cards 17-1 and 17-2 are turned on.

After the IC cards 17-1 and 17-2 are turned on in step S2-1, step S2-2 is performed on the IC cards 17-1 and 17-2. In step S2-2, all of the data stored in the nonvolatile memory 14 of each of the IC cards 17-1 and 17-2 is read out so that the exclusive logical sum of (that is, the result of an XOR operation performed on) all of the data read out from each nonvolatile memory 14 is obtained.

After the exclusive logical sum of all of the data read out from each nonvolatile memory 14 is obtained in step S2-2, in step S2-3, the exclusive logical sum is compared with the checksum data stored in the checksum data area 17j of the nonvolatile memory 14. In step S2-4, it is determined, as a result of the comparison in step S2-3, whether the checksum data stored in the checksum data area 17j of the nonvolatile memory 14 matches the exclusive logical sum of all of the data obtained in step S2-2.

If the checksum data matches the exclusive logical sum of all of the data in step S2-4, it is determined that the data is normal. Therefore, it is recognized that each of the IC cards 17-1 and 17-2 operates normally, and step S2-5 is performed. In step S2-5, the electronic money management apparatus 16 is informed of the normality of each of the IC cards 17-1 and 17-2. After the electronic money management apparatus 16 is informed, in step S2-5, that the operations are normal, step S2-6 is performed. In step S2-6, the starting of transactions is enabled.

If the checksum data does not match the exclusive logical sum of all of the data with respect to any of the IC cards 17-1 and 17-2, it is recognized that the corresponding one of the IC cards 17-1 and 17-2 is abnormal, and step S2-7 is performed. In step S2-7, the electronic money management apparatus 16 is informed of the abnormality of the corresponding one of the IC cards 17-1 and 17-2. After the electronic money management apparatus 16 is informed of the abnormality in step S2-7, in step S2-8, the starting of transactions is inhibited.

Thereby, when the electronic money management apparatus 16 is turned on in step S1-1, the correctness of the IC cards 17-1 and 17-2 is automatically checked.

In FIG. 4A, after the IC cards 17-1 and 17-2 are loaded into the electronic money management apparatus 16 and the electronic money management apparatus 16 is turned on in step S1-1, step S1-2 is performed. In step S1-2, the card characteristic numbers are read from the card characteristic number area 17a and the card number registration area 17b of each of the loaded IC cards 17-1 and 17-2.

After the card characteristic numbers are read from the card characteristic number area 17a and the card number registration area 17b of each of the loaded IC cards 17-1 and 17-2 in step S1-2, step S1-3 is performed. In step S1-3, it is determined whether either one of the paired IC cards 17-1 and 17-2 is a manager IC card (an IC card for a manager).

If it is determined in step S1-3 that either one of the paired IC cards 17-1 and 17-2 is a manager IC card, next, step S1-4 is performed.

In step S1-4, it is determined whether the flag stored in the INVALID flag area 17g of the IC card paired with the IC card recognized as a manager IC card in step S1-3 is valid, that is, ON.

If the flag stored in the INVALID flag area 17g of the IC card paired with the manager IC card is ON in step S1-4, that is, if the IC card paired with the manager IC card is invalid, step S1-5 is performed.

In step S1-5, the flag stored in the INVALID flag area 17g of the IC card paired with the manager IC card is made invalid or turned OFF.

If the flag stored in the INVALID flag area 17g of the IC card paired with the manager IC card is OFF in step S1-4, or if the flag stored in the INVALID flag area 17g of the IC card paired with the manager IC card is made invalid in step S1-5, an instruction is given to extract the manager IC card from the electronic money management apparatus 16. When the instruction is given to extract the manager IC card from the electronic money management apparatus 16, the manager extracts the manager IC card and loads a new IC card, for instance. When the new IC card is loaded, the operation is returned to step S1-2.

If it is determined in step S1-3 that neither of the IC cards 17-1 and 17-2 loaded in the electronic money management apparatus 16 is a manager IC card, next, step S1-6 is performed. In step S1-6, it is determined whether the flag stored in the INVALID flag area 17g of each of the loaded IC cards 17-1 and 17-2 is ON. If the flag of either one of the loaded IC cards 17-1 and 17-2 is ON, that is, if either one of the loaded IC cards 17-1 and 17-2 is invalid, step S1-7 is performed. In step S1-7, a transaction operation of the value data, for instance, is inhibited. That is, if either one of the paired IC cards 17-1 and 17-2 is invalid, electronic money transactions cannot be performed. Therefore, electronic commerce transactions cannot be performed with an invalid IC card.

Further, if both of the flags stored in the INVALID flag areas 17g of the IC cards 17-1 and 17-2 loaded in the electronic money management apparatus 16 are OFF in step S1-6, next, step S1-8 is performed. In step S1-8, the apparatus numbers stored in the apparatus number registration areas 17c of the IC cards 17-1 and 17-2 are read and compared with the apparatus number stored in the nonvolatile memory 7 of the electronic money management apparatus 16.

Figure 4B:
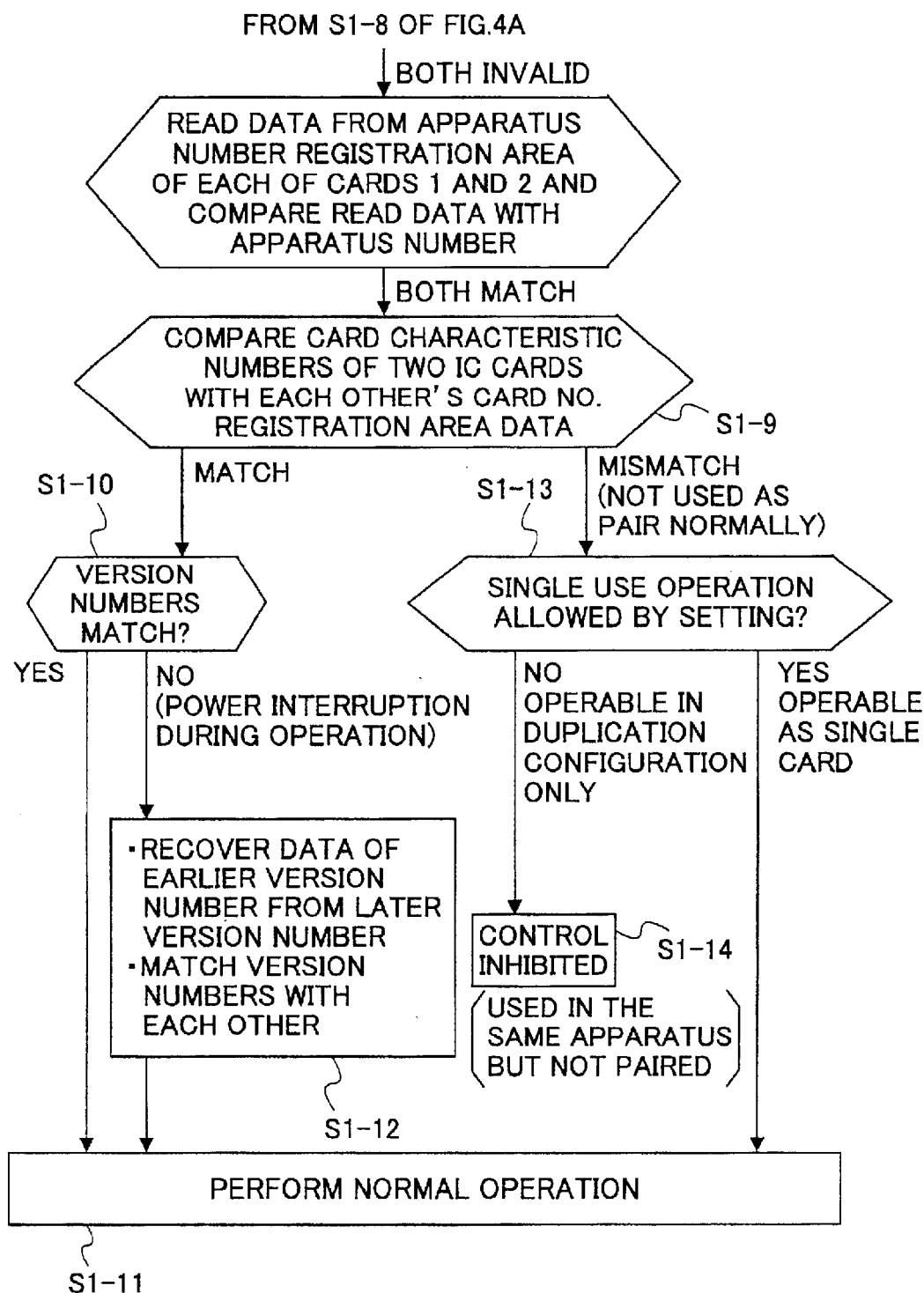

If the apparatus number stored in the nonvolatile memory 7 of the electronic money management apparatus 16 matches, or is identical to, the apparatus numbers read from the apparatus number registration areas 17c of the IC cards 17-1 and 17-2 in step S1-8, next, step S1-9 of FIG. 4B is performed. In step S1-9, the pair card characteristic numbers stored in the card number registration areas 17b of the IC cards 17-1 and 17-2 are compared, respectively, with the card characteristic numbers of the IC cards 17-2 and 17-1 read out in step S1-2.

If, in step S1-9, the card characteristic numbers stored in the card number registration areas 17b of the IC cards 17-1 and 17-2 are identical, respectively, to the card characteristic numbers of the IC cards 17-2 and 17-1 read out in step S1-2, next, step S1-10 is performed. In step S1-10, the version information is read from the version number management area 17d of each of the IC cards 17-1 and 17-2 and a comparison is made.

If the version information read from the version number management area 17d of the IC card 17-1 matches the version information read from the version number management area 17d of the IC card 17-2, it can be determined that the data consistency of the value data is maintained between the duplicate IC cards 17-1 and 17-2. Therefore, step S1-11 is performed to enable normal electronic commerce transactions using the IC cards 17-1 and 17-2.

If the version information read from the version number management area 17d of the IC card 17-1 does not match the version information read from the version number management area 17d of the IC card 17-2 in step S1-10, step S1-11 is performed after step S1-12. In step S1-12, the IC card of earlier version information recovers data from the IC card of later version information so that the version numbers of the IC cards match each other. Thereby, even if the power is turned off before the value data of the IC card 17-2 is updated after the value data of the IC card 17-1 is updated by transactions, causing a difference between the version numbers, normal electronic commercial transactions are allowed to start in step S1-11 after the value data of the IC cards 17-1 and 17-2 match each other.

Further, if, in step S1-9, the pair card characteristic numbers stored in the card number registration areas 17b of the IC cards 17-1 and 17-2 do not match the card characteristic numbers of the IC cards 17-2 and 17-1 read out in step S1-2, that is, if the electronic money management apparatus 16 is loaded with IC cards not to be used as a pair, next, step S1-13 is performed. In step S1-13, the flags stored in the single use flag setting areas 17l of the IC cards 17-1 and 17-2 are read out so as to determine whether the flags stored in the single use flag setting areas 17l are valid (ON) or invalid (OFF).

If either one of the single use flags are invalid in step S1-13, next, step S1-14 is performed. In step S1-14, it is inhibited to control the IC card whose single use is invalid. If the single use flags are valid, normal electronic commercial transactions are conducted in step S1-11.

The above-described operation is performed when the apparatus number stored in the nonvolatile memory 7 of the electronic money management apparatus 16 is identical to the apparatus numbers read from the apparatus number registration areas 17c of the IC cards 17-1 and 17-2 in step S1-8.

Next, a description will be given of an operation performed if the apparatus number stored in the nonvolatile memory 7 of the electronic money management apparatus 16 is identical to only one of the apparatus numbers read from the apparatus number registration areas 17c of the IC cards 17-1 and 17-2 in step S1-8.

Figure 4C:
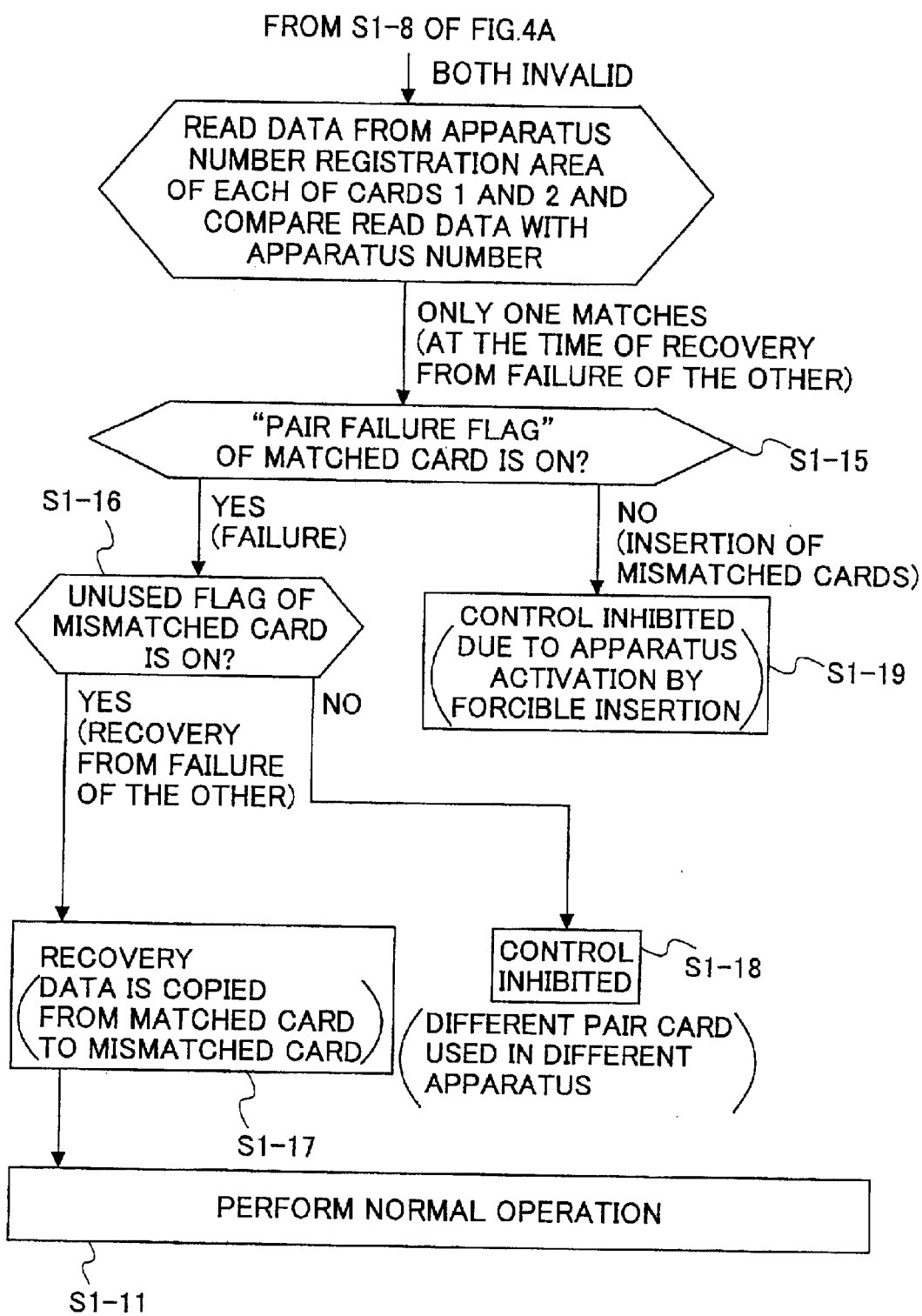

If the apparatus number stored in the nonvolatile memory 7 of the electronic money management apparatus 16 is identical to only one of the apparatus numbers read from the apparatus number registration areas 17c of the IC cards 17-1 and 17-2 in step S1-8, next, step S1-15 of FIG. 4C is performed. In step S1-15, the pair failure flag stored in the pair failure flag area 17e of either the IC card 17-1 or the IC card 17-2 whose apparatus number read from the apparatus number registration area 17c is identical to the apparatus number stored in the nonvolatile memory 7 of the electronic money management apparatus 16 is read out so as to determine whether the read-out pair failure flag is ON or OFF.

If the read-out pair failure flag is ON in step S1-15, that is, if the pair IC card had a failure in the past, next, step S1-16 is performed. In step S1-16, the UNUSED flag stored in the UNUSED flag area 17f of either the IC card 17-1 or the IC card 17-2 whose apparatus number read from the apparatus number registration area 17c is not identical to, or mismatches, the apparatus number stored in the nonvolatile memory 7 of the electronic money management apparatus 16 is read out so as to determine whether the read-out UNUSED flag is ON or OFF.

If the read-out UNUSED flag is ON in step S1-16, step S1-17 is performed. In step S1-17, the data of either the IC card 17-1 or the IC card 17-2 whose apparatus number read from the apparatus number registration area 17c is identical to the apparatus number stored in the nonvolatile memory 7 of the electronic money management apparatus 16 is duplicated in the pair IC card. By step S1-17, consistency is established between the IC cards 17-1 and 17-2 loaded in the electronic money management apparatus 16.

After consistency is established between the IC cards 17-1 and 17-2, in step S1-11, normal electronic commerce transactions are conducted.

If the UNUSED flag stored in the UNUSED flag area 17f of either the IC card 17-1 or the IC card 17-2 whose apparatus number read from the apparatus number registration area 17c is not identical to the apparatus number stored in the nonvolatile memory 7 of the electronic money management apparatus 16 is OFF in step S1-16, next, step S1-18 is performed. In step S1-18, the electronic money management apparatus 16 inhibits electronic commercial transactions. In this case, for instance, it can be determined that the IC card whose apparatus number is mismatched is not unused, that is, the IC card whose apparatus number is mismatched is recorded with other data. Therefore, control is inhibited to prevent data duplication between the IC cards 17-1 and 17-2, thereby preventing the other data from being erased.

Further, if the read-out pair failure flag is OFF in step S1-15, that is, if the pair IC card had no failure in the past, next, step S1-19 is performed. In step S1-19, the electronic money management apparatus 16 inhibits electronic commercial transactions. That is, it can be determined that a different IC card is forcibly inserted and activated since the pair IC card has no failure history. Therefore, control is inhibited to protect the data of the wrongly inserted IC card.

The above-described operation is performed if the apparatus number stored in the nonvolatile memory 7 of the electronic money management apparatus 16 is identical to only one of the apparatus numbers read from the apparatus number registration areas 17c of the IC cards 17-1 and 17-2.

Next, a description will be given of an operation performed if the apparatus number stored in the nonvolatile memory 7 of the electronic money management apparatus 16 is identical to neither of the apparatus numbers read from the apparatus number registration areas 17c of the IC cards 17-1 and 17-2 in step S1-8.

If the apparatus number stored in the nonvolatile memory 7 of the electronic money management apparatus 16 is identical to neither of the apparatus numbers read from the apparatus number registration areas 17c of the IC cards 17-1 and 17-2 in step S1-8, first, step S1-20 of FIG. 4D is performed. In step S1-20, the pair IC card characteristic numbers stored in the card number registration areas 17b of the IC cards 17-1 and 17-2 are compared respectively with the card characteristic numbers of the IC cards 17-2 and 17-1 read out in step S1-2.

If, in step S1-20, the pair IC card characteristic numbers stored in the card number registration areas 17b of the IC cards 17-1 and 17-2 are identical, respectively, to the card characteristic numbers of the IC cards 17-2 and 17-1 read out in step S1-2, it is determined that the IC cards 17-1 and 17-2 paired with each other have been moved as paired from another electronic money management apparatus. In this case, first, step S1-21 is performed. In step S1-21, the apparatus number stored in the nonvolatile memory 7 of the electronic money management apparatus 16 is stored in the apparatus number registration areas 17c of the IC cards 17-1 and 17-2. By step S1-21, the apparatus number of the electronic money management apparatus 16 loaded with the IC cards 17-1 and 17-2 matches the apparatus numbers stored in the IC cards 17-1 and 17-2.

After it is determined in step S1-21 that the apparatus number of the electronic money management apparatus number 16 is identical to the apparatus numbers stored in the IC cards 17-1 and 17-2, step S1-22 is performed. In step S1-22, the version information stored in the version information management area 17d of each of the IC cards 17-1 and 17-2 is read out and a comparison is made.

If the version information stored in the version number management area 17d of the IC card 17-1 matches the version information stored in the version number management area 17d of the IC card 17-2 in step S1-22, it can be determined that the data of the IC cards 17-1 and 17-2 are consistent. Therefore, normal electronic commercial transactions are enabled in step S 1-11.

If the version information stored in the version number management area 17d of the IC card 17-1 mismatches the version information stored in the version number management area 17d of the IC card 17-2 in step S1-22, it is possible, for instance, that due to a failure of another electronic money management apparatus in which the IC cards 17-1 and 17-2 have been loaded, the IC card 17-2 is prevented from being updated to be consistent with the data of the IC card 17-1 after the data of the IC card 17-1 is updated. Therefore, step S1-23 is performed so that the data of the IC cards 17-1 and 17-2 are consistent with each other. The data of the IC card of earlier version information is updated by the IC card of later version information so that the version numbers match each other. By this operation, even if the power is turned off before the value data of the IC card 17-2 is updated after the value data of the IC card 17-1 is updated by transactions, causing a difference between the version numbers, normal electronic commercial transactions are allowed to start in step S1-11 after the data of the IC cards 17-1 and 17-2 match each other.

If, in step S1-20, the pair IC card characteristic numbers stored in the card number registration areas 17b of the IC cards 17-1 and 17-2 are not identical, respectively, to the card characteristic numbers of the IC cards 17-2 and 17-1 read out in step S1-2, it is determined that a pair of IC cards that are not normally used are loaded in the electronic money management apparatus 16. In this case, first, step S1-24 is performed. In step S1-24, the UNUSED flags stored in the UNUSED flag areas 17f of the IC cards 17-1 and 17-2 are read out so as to determine whether the UNUSED flags are ON or OFF.

If both of the UNUSED flags stored in the UNUSED flag areas 17f of the IC cards 17-1 and 17-2 are ON in step S1-24, that is, if both of the IC cards 17-1 and 17-2 are unused in step S1-24, it can be determined that the IC cards 17-1 and 17-2 are to be recorded with new data. Thus, step S1-25 is performed. In step S1-25, the IC cards 17-1 and 17-2 store the card characteristic numbers of their respective pair IC cards in their respective card number registration areas 17b and store, in their respective apparatus number registration areas 17c, the apparatus number stored in the nonvolatile memory 7 of the electronic money management apparatus 16 in which the IC cards 17-1 and 17-2 are loaded. Further, the flags stored in the UNUSED flag areas 17f are turned OFF.

By step S1-25, data duplication is performed between the IC cards 17-1 and 17-2 so that the IC cards 17-1 and 17-2 are write-enabled. If the data duplication is performed between the IC cards 17-1 and 17-2 so that the IC cards 17-1 and 17-2 are write-enabled in step S1-25, normal electronic commercial transactions are conducted in step S1-11.

If the UNUSED flag stored in the UNUSED flag area 17f of either the IC card 17-1 or the IC card 17-2 is OFF in step S1-24, that is, if either the IC card 17-1 or the IC card 17-2 is in use in step S1-24, no data duplication is performable between the IC cards 17-1 and 17-2, so that step S1-26 is performed. In step S1-26, the electronic money management apparatus 16 inhibits electronic commercial transactions.

The above-described operation is performed if the apparatus number stored in the nonvolatile memory 7 of the electronic money management apparatus 16 is identical to neither of the apparatus numbers read from the apparatus number registration areas 17c of the IC cards 17-1 and 17-2 in step S1-8.

When the power is turned on, the above-described operations are performed so that authentication of the duplicate cards is performed. The above-described operations prevent disadvantages such as accidental data erasure and alteration.

Next, a description will be given of an operation in the case of extracting the IC cards 17-1 and 17-2 from the electronic money management apparatus 16 while normal electronic commercial transactions are conducted in step S1-11.

Figure 6:
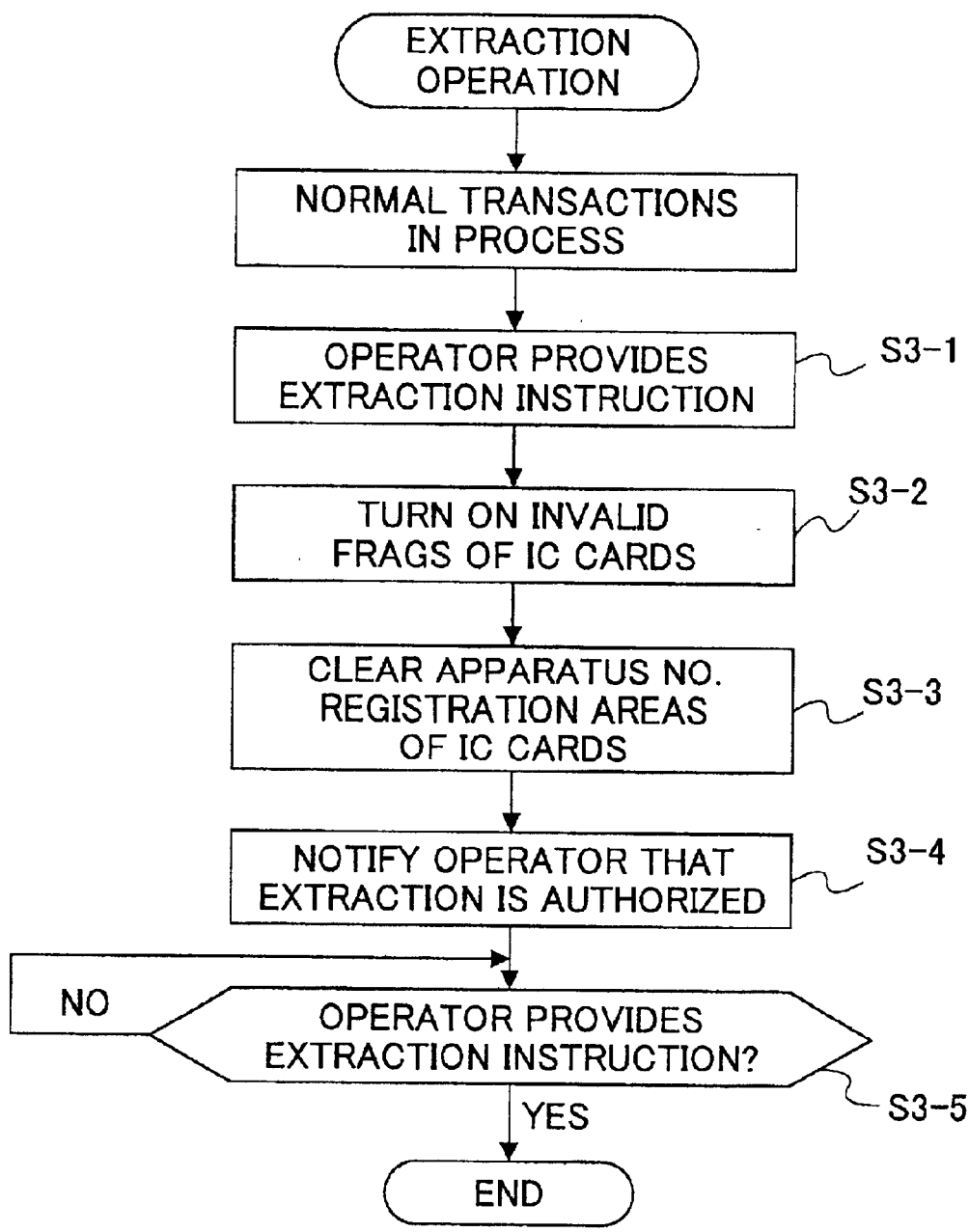
FIG. 6 is a flowchart of an operation of extracting the IC card according to the first embodiment of the present invention.

FIG. 6 is a flowchart of the operation in the case of extracting the IC cards 17-1 and 17-2 of the first embodiment of the present invention.

In the case of extracting the IC cards 17-1 and 17-2 from the electronic money management apparatus 16, first, in step S3-1, an operator provides an extraction instruction to extract the IC cards 17-1 and 17-2 to the electronic money management apparatus 16.

After the operator provides the extraction instruction in step S3-1, step S3-2 is performed. In step S3-2, the flags stored in the INVALID flag areas 17g of the IC cards 17-1 and 17-2 to be extracted are turned ON, that is, the IC cards 17-1 and 17-2 to be extracted are made invalid.

After the IC cards 17-1 and 17-2 are made invalid in step S3-2, step S3-3 is performed. In step S3-3, the apparatus number stored in the apparatus number registration area 17c of each of the IC cards is erased.

After the apparatus number stored in the apparatus number registration area 17c of each of the IC cards is erased in step S3-3, step S3-4 is performed. In step S3-4, the operator is notified that the extraction is authorized.

After the operator is notified that the extraction is authorized in step S3-4, step S3-5 is performed. In step S3-5, an extraction instruction from the operator is detected. The operator extracts the IC cards 17-1 and 17-2 from the electronic money management apparatus 16 and provides the extraction instruction to the electronic money management apparatus 16. After the operator provides the extraction instruction to the electronic money management apparatus 16, the instruction to extract the IC cards 17-1 and 17-2 is detected in step S3-5, and the operation ends.

Thereby, the extraction of the IC cards 17-1 and 17-2 is performed normally. If the extraction of the IC cards 17-1 and 17-2 is performed normally as described above, the apparatus number stored in each of the apparatus number registration areas 17c is erased, and the INVALID flags stored in the INVALID flag areas 17g of the nonvolatile memories 7 of the IC cards 17-1 and 17-2 are turned ON.

Next, a description will be given of specific operations to which the above-described operations are applied.

FIGS. 7 through 13 are diagrams for illustrating IC card movements according to the first embodiment of the present invention and operations performed in those cases.

Figure 7:
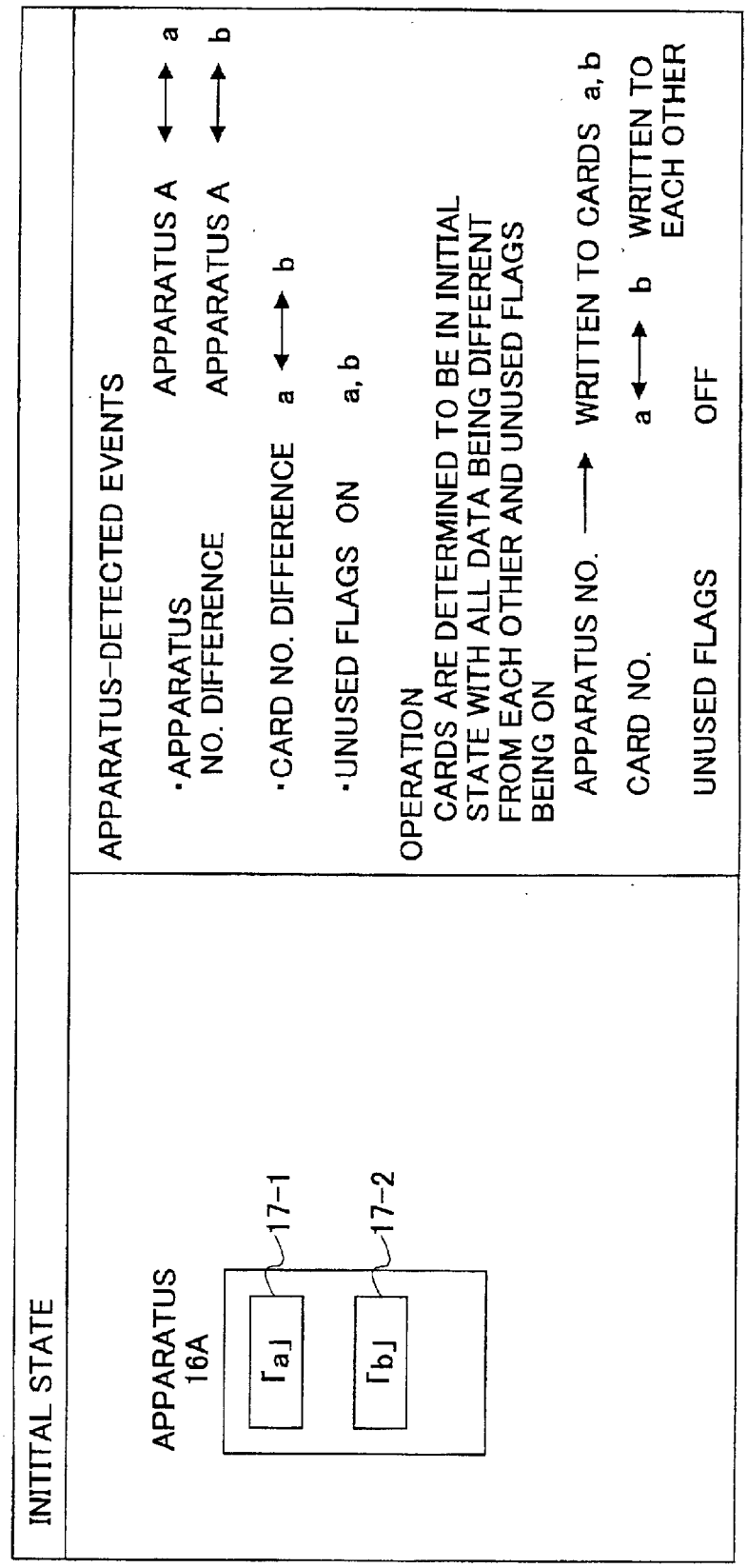
FIG. 7 is a diagram for illustrating an operation at a time of loading the IC card in an initial state into an electronic money management apparatus according to the first embodiment of the present invention.

FIG. 7 shows a case where the IC cards 17-1 and 17-2 having different apparatus numbers and different card characteristic numbers with the UNUSED flags being valid are loaded into the electronic money management apparatus 16.

In this case, the IC cards 17-1 and 17-2 are recorded with the apparatus number of the electronic money management apparatus 16 in which the IC cards 17-1 and 17-2 are loaded and each other's card characteristic number, and have their UNUSED flags made invalid or turned OFF. In this state, data duplication is performable between the IC cards 17-1 and 17-2.

Figure 8:
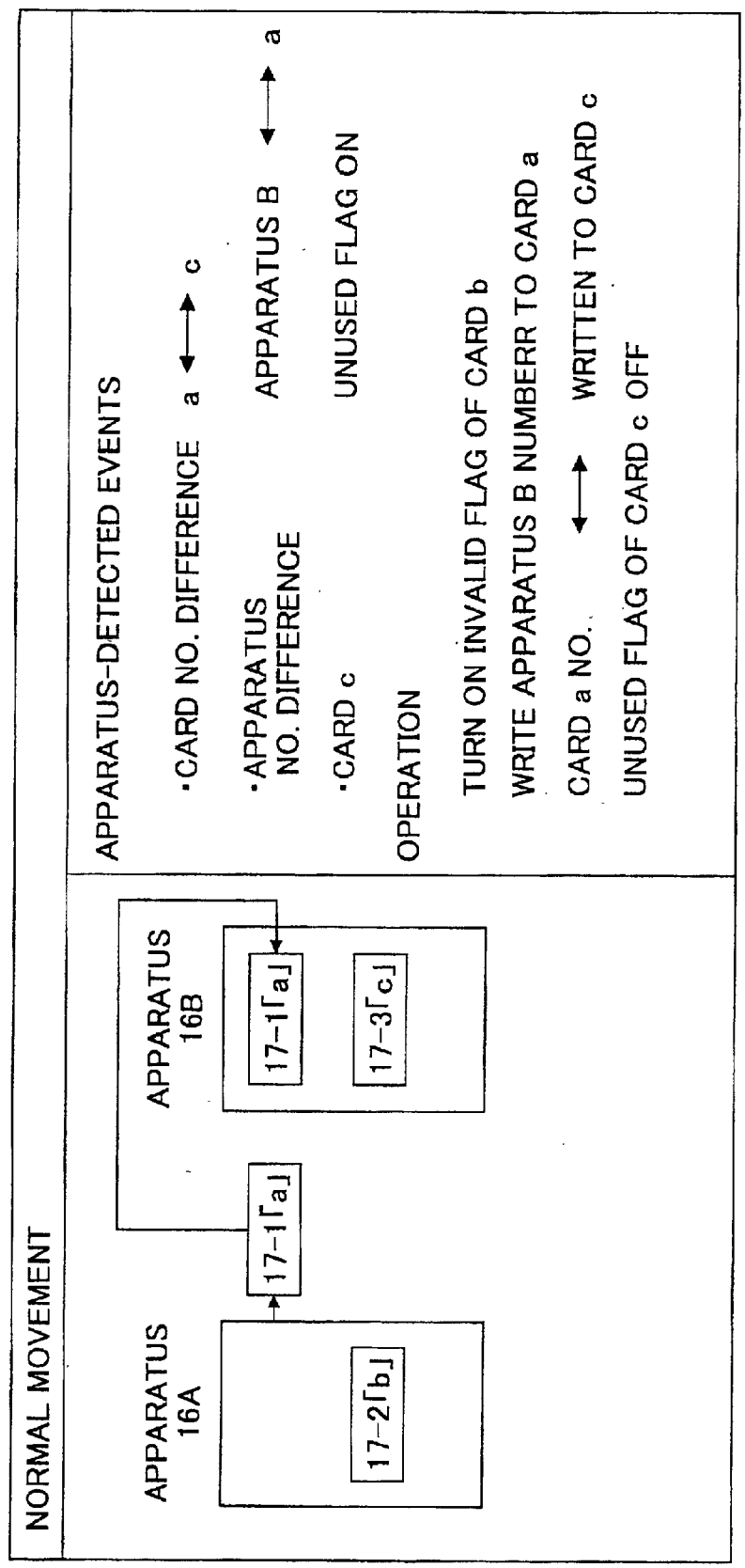
FIG. 8 is a diagram for illustrating an operation at a time of normally moving the IC card from one electronic money management apparatus to another according to the first embodiment of the present invention.

FIG. 8 shows a case where the IC card 17-1 loaded in an electronic money management apparatus 16A is subjected to the normal extraction operation as shown in FIG. 6 to be moved to another electronic money management apparatus 16B.

In this case, the INVALID flag of the IC card 17-2 loaded in the electronic money management apparatus 16A is turned OFF, and the apparatus number of the electronic money management apparatus 16B is written to the IC card 17-1 loaded in the electronic money management apparatus 16B. If the UNUSED flag of an IC card 17-3 loaded in the electronic money management apparatus 16B is ON at this point, data duplication is performed between the IC cards 17-1 and 17-3 in the electronic money management apparatus 16B, and the data of the IC card 17-2 loaded in the electronic money management apparatus 16A is made invalid.

Figure 9:
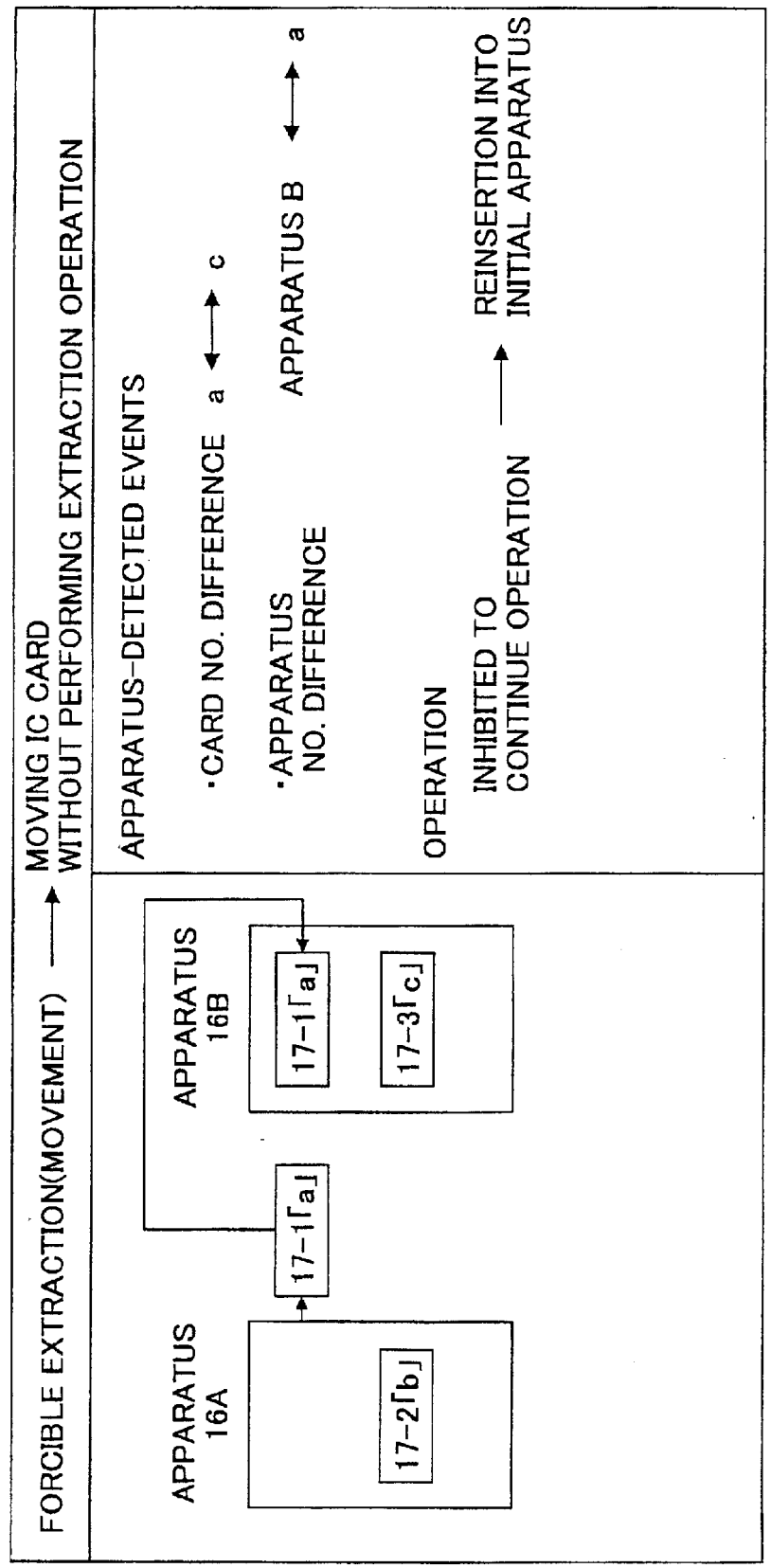
FIG. 9 is a diagram for illustrating an operation at a time of extracting the IC card forcibly from the electronic money management apparatus according to the first embodiment of the present invention.

FIG. 9 shows a case where the IC card 17-1 loaded in the electronic money management apparatus 16A is moved to the different electronic money management apparatus 16B without being subjected to the normal extraction operation as shown in FIG. 6.

In this case, it is inhibited to continue the operation any further, and the IC card 17-1 is reinserted into the electronic money management apparatus 16A.

Figure 10:
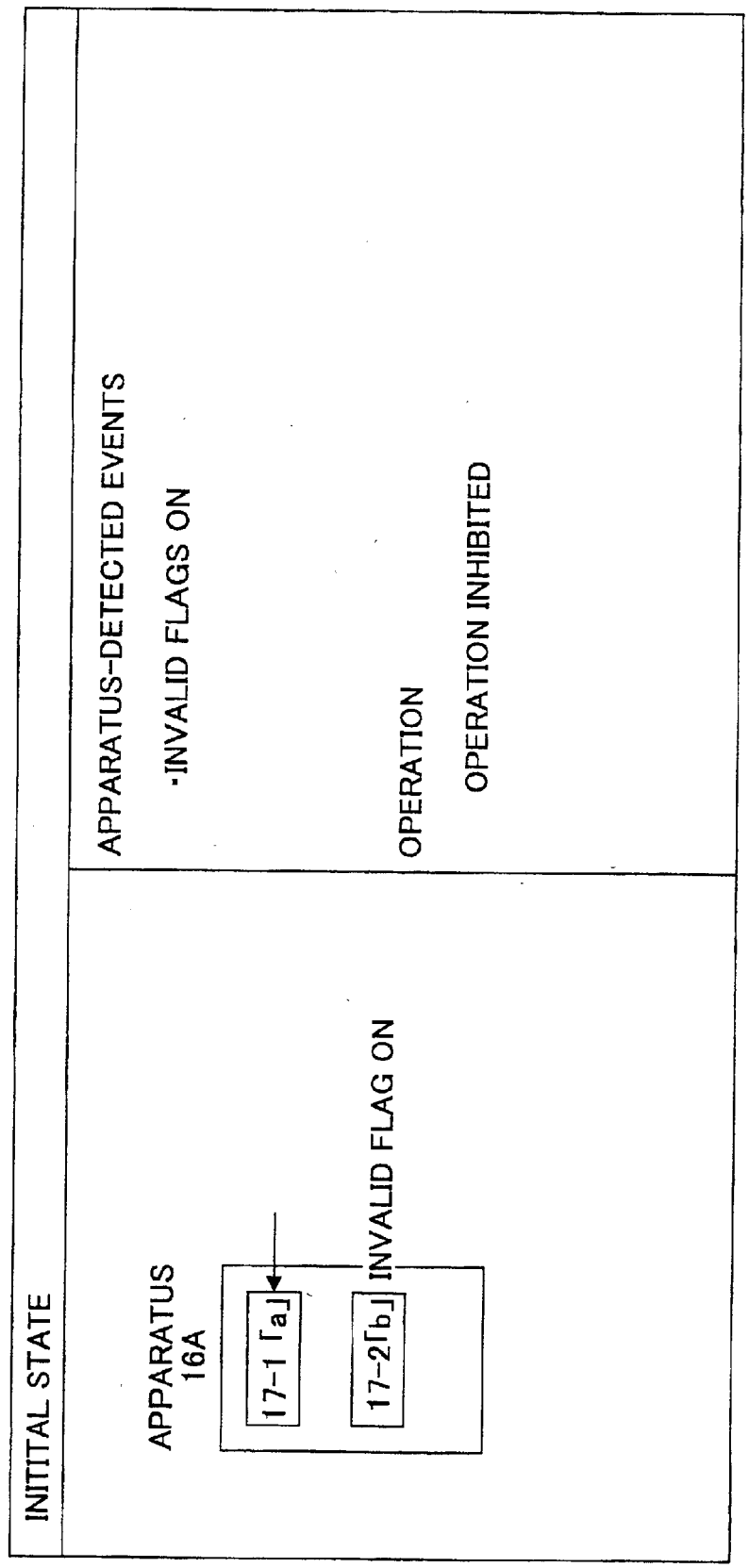
FIG. 10 is a diagram for illustrating an operation at a time of loading the IC card into the electronic money management apparatus according to the first embodiment of the present invention.

FIG. 10 shows a case where the IC card 17-1 whose INVALID flag is ON is loaded into the electronic money management apparatus 16A loaded with the IC card 17-2 whose INVALID flag is ON.

In this case, the IC cards 17-1 and 17-2 are disabled from operating.

Figure 11:
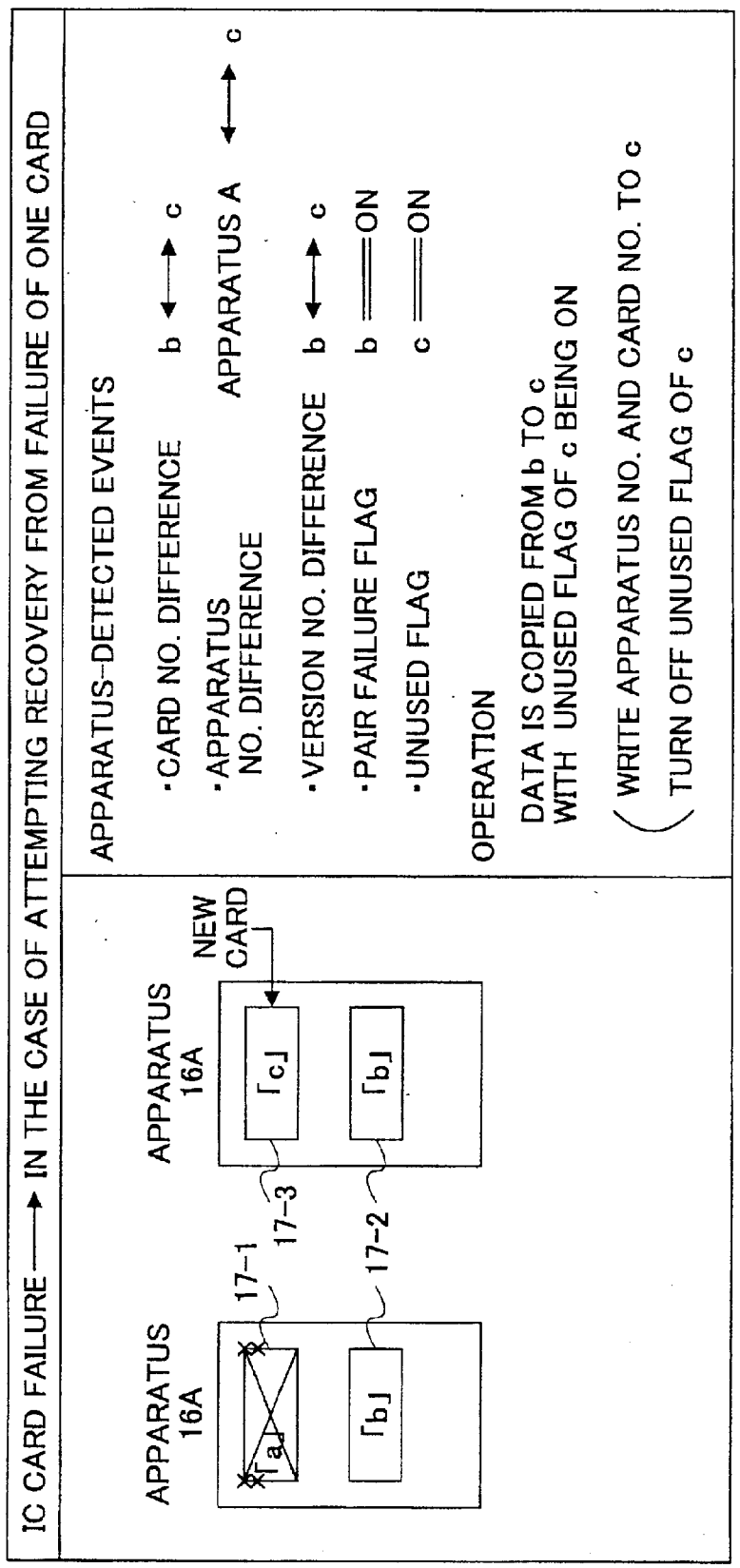
FIG. 11 is a diagram for illustrating an operation at a time of occurrence of a failure in the IC card according to the first embodiment of the present invention.

FIG. 11 shows a case where the IC card 17-1 loaded in the electronic money management apparatus 16A has a failure and the IC card 17-3 whose UNUSED flag is ON is loaded to replace the failed IC card 17-1.

In this case, the UNUSED flag of the newly loaded IC card 17-3 is turned OFF, and the data of the IC card 17-2 is copied to the IC card 17-3, thereby performing data duplication between the IC cards 17-2 and 17-3.

Figure 12:
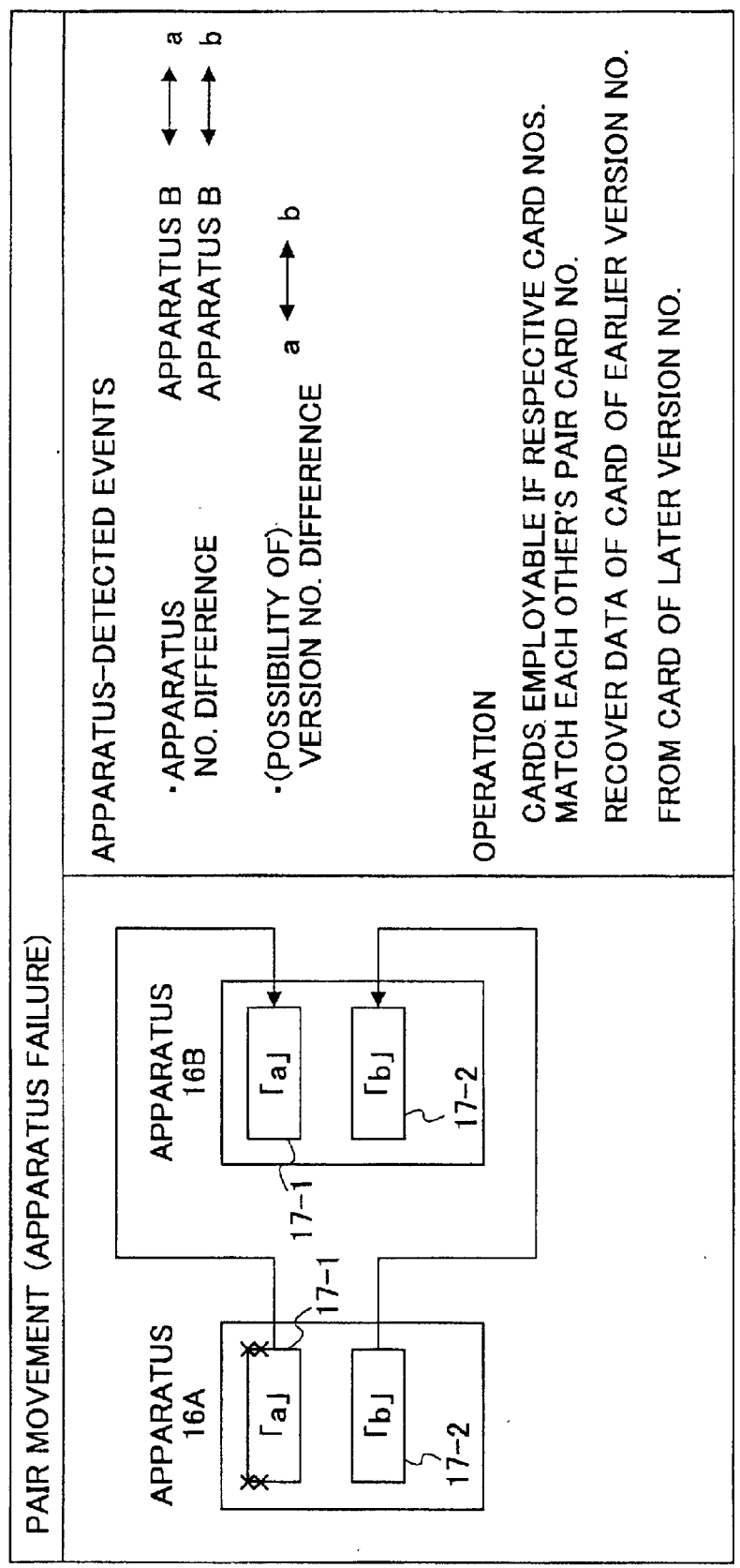
FIG. 12 is a diagram for illustrating an operation at a time of occurrence of a failure in the electronic money management apparatus according to the first embodiment of the present invention.

FIG. 12 shows a case where the electronic money management apparatus 16A loaded with the IC cards 17-1 and 17-2 in which the data is duplicated has a failure while writing data to the IC card 17-1, and therefore, the IC cards 17-1 and 17-2 have been moved to the other electronic money management apparatus 16B.

In this case, the IC cards 17-1 and 17-2 are employable as far as the pair IC card characteristic numbers stored in the IC cards 17-1 and 17-2 are identical to the card characteristic numbers of the IC cards 17-2 and 17-1, respectively. However, the IC cards 17-1 and 17-2 have different data version numbers. Therefore, the data of the IC card of the earlier version number is recovered from the IC card of the later version number.

Figure 13:
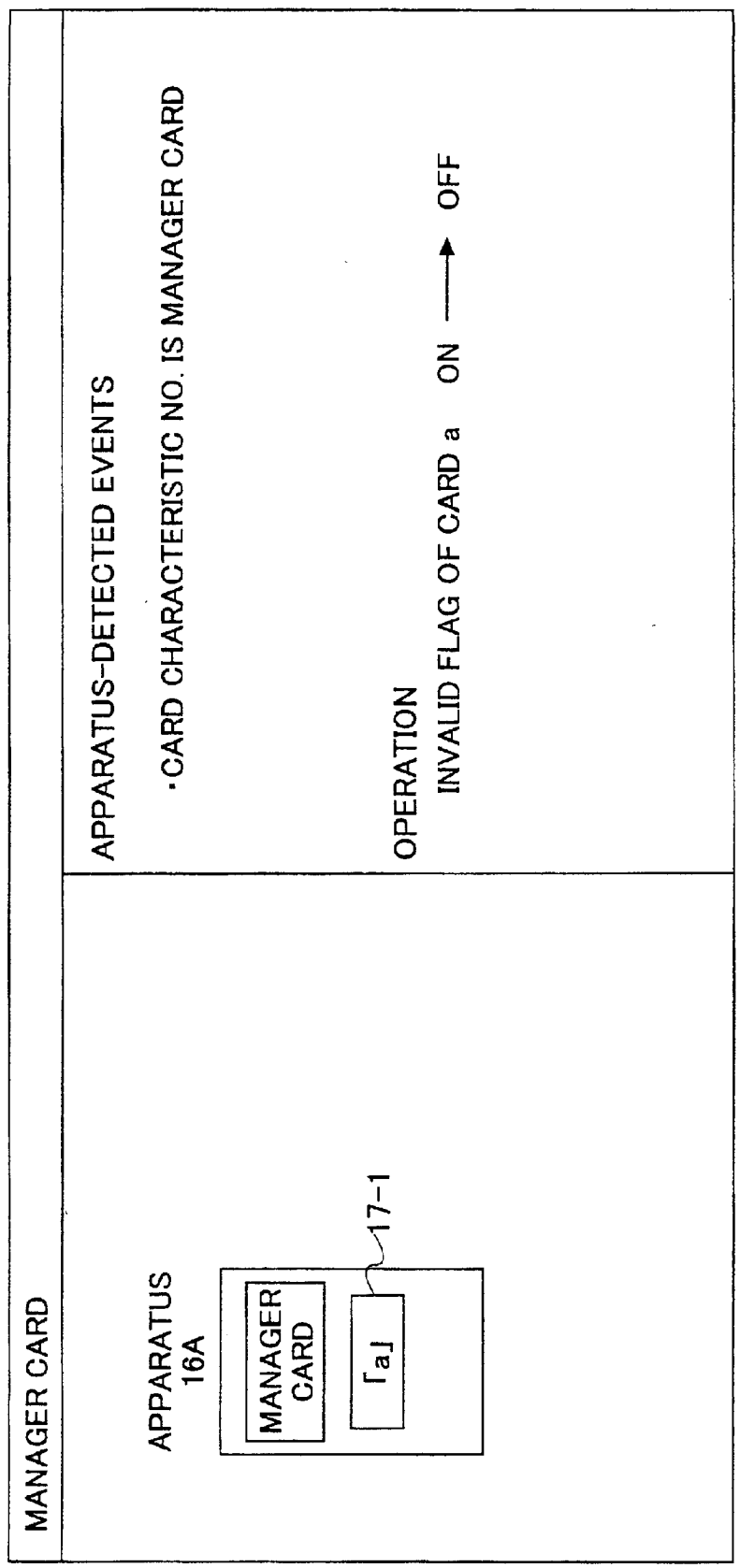
FIG. 13 is a diagram for illustrating an operation at a time of loading a manager card into the electronic money management apparatus according to the first embodiment of the present invention.

FIG. 13 shows a case where a manager IC card is loaded in the electronic money management apparatus 16A.

The manager IC card is authorized to turn OFF the INVALID flag of the IC card 17-1 irrespective of the card characteristic number. Therefore, the electronic money management apparatus 16A is authorized to access the IC card 17-1.

Next, a description will be given of processing performed at the time of the normal operation of step S1-11.

Figure 14:
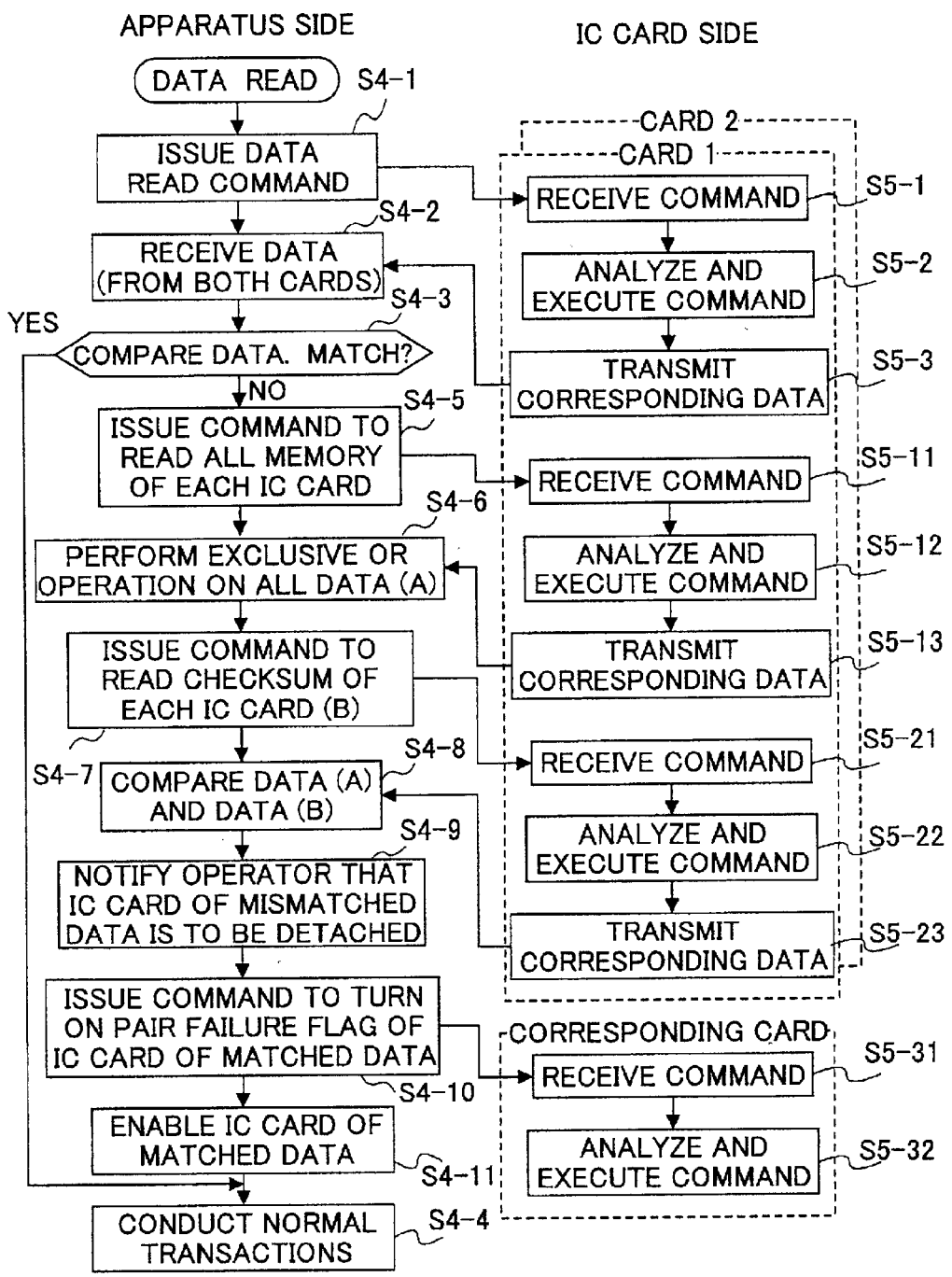
FIG. 14 is a flowchart of a normal operation according to the first embodiment of the present invention.

FIG. 14 is a flowchart of the processing performed at the time of the normal operation of the first embodiment of the present invention.

In step S4-1, the electronic money management apparatus 16 issues a data read command to each of the IC cards 17-1 and 17-2.

In step S5-1, each of the IC cards 17-1 and 17-2 receives the data read command issued in step S4-1. After each of the IC cards 17-1 and 17-2 receives the data read command in step S5-1, step S5-2 is performed. In step S5-2, each of the IC cards 17-1 and 17-2 analyzes and executes the command.

After each of the IC cards 17-1 and 17-2 analyzes and executes the command from the electronic money management apparatus 16 in step S5-2, step S5-3 is performed. In step S5-3, each of the IC cards 17-1 and 17-2 transmits data read out in accordance with the command to the electronic money management apparatus 16.

After each of the IC cards 17-1 and 17-2 reads and transmits the data in step S5-3, in step S4-2, the electronic money management apparatus 16 receives the data from each of the IC cards 17-1 and 17-2. After the electronic money management apparatus 16 receives the data from each of the IC cards 17-1 and 17-2 in step S4-2, step S4-3 is performed. In step S4-3, the electronic money management apparatus 16 compares the data received from the IC card 17-1 with the data received from the IC card 17-2.

If the data match in step S4-3, step S4-4 is performed. In step S4-4, normal transactions are conducted.

If the data do not match in step S4-3, step S4-5 is performed. In step S4-5, the electronic money management apparatus 16 issues a command to read all of the data of each of the IC cards 17-1 and 17-2.

After the electronic money management apparatus 16 issues the command to read all of the data in step S4-5, in step S5-11, each of the IC cards 17-1 and 17-2 receives the command. After receiving the command to read all of the data from the electronic money management apparatus 16, in step S5-12, each of the IC cards 17-1 and 17-2 analyzes and executes the command. In step S5-13, each of the IC cards 17-1 and 17-2 transmits the data read out as a result of executing the command to the electronic money management apparatus 16.

After the electronic money management apparatus 16 receives all of the data of each of the IC cards 17-1 and 17-2, step S4-6 is performed. In step S4-6, the electronic money management apparatus 16 calculates the exclusive logical sum of all of the data of each of the IC cards 17-1 and 17-2.

After the electronic money management apparatus 16 calculates the exclusive logical sum of all of the data of each of the IC cards 17-1 and 17-2 in step S4-6, step S4-7 is performed. In step S4-7, the electronic money management apparatus 16 issues a command to read the checksum data from each of the IC cards 17-1 and 17-2.

After the electronic money management apparatus 16 issues the command to read the checksum data in step S4-7, in step S5-21, each of the IC cards 17-1 and 17-2 receives the command. After receiving the command in step S5-21, each of the IC cards 17-1 and 17-2 analyzes and executes the received command. The checksum data is obtained as a result of executing the command in step S5-22. In step S5-23, each of the IC cards 17-1 and 17-2 transmits the checksum data obtained in step S5-22 to the electronic money management apparatus 16.

After the electronic money management apparatus 16 receives the checksum data transmitted from each of the IC cards 17-1 and 17-2, step S4-8 is performed. In step S4-8, the electronic money management apparatus 16 compares the exclusive logical sums of all of the data calculated in step S4-6 with the checksum data transmitted from the IC cards 17-1 and 17-2 so as to determine whether the exclusive logical sum and the checksum data of each of the IC cards 17-1 and 17-2 match according to the results of the comparison. Suppose, for instance, that the data of the IC card 17-1 are mismatched and the data of the IC card 17-2 are matched.

After the determination results are obtained in step S4-8, step S4-9 is performed. In step S4-9, the electronic money management apparatus 16 notifies the operator that the IC card 17-1 whose data are shown as mismatched in the comparison results is to be detached.

Next, step S4-10 is performed. In step S4-10, the electronic money management apparatus 16 issues a command for the IC card 17-2 whose data are shown as matched in the comparison results of step S4-8 to turn ON its pair failure flag.

In step S5-31, the IC card 17-2, to which the command to turn ON the pair failure flag is issued in step S4-10, receives the command, and in step S5-32, the IC card 17-2 executes the received command and turns ON the pair failure flag.

In step S4-11, the electronic money management apparatus 16 enables the IC card 17-2 whose data are shown as matched in the comparison results of step S4-8, and in step S4-4, the electronic money management apparatus 16 enables normal transactions.

Next, a description will be given of a data write operation.

Figure 15:
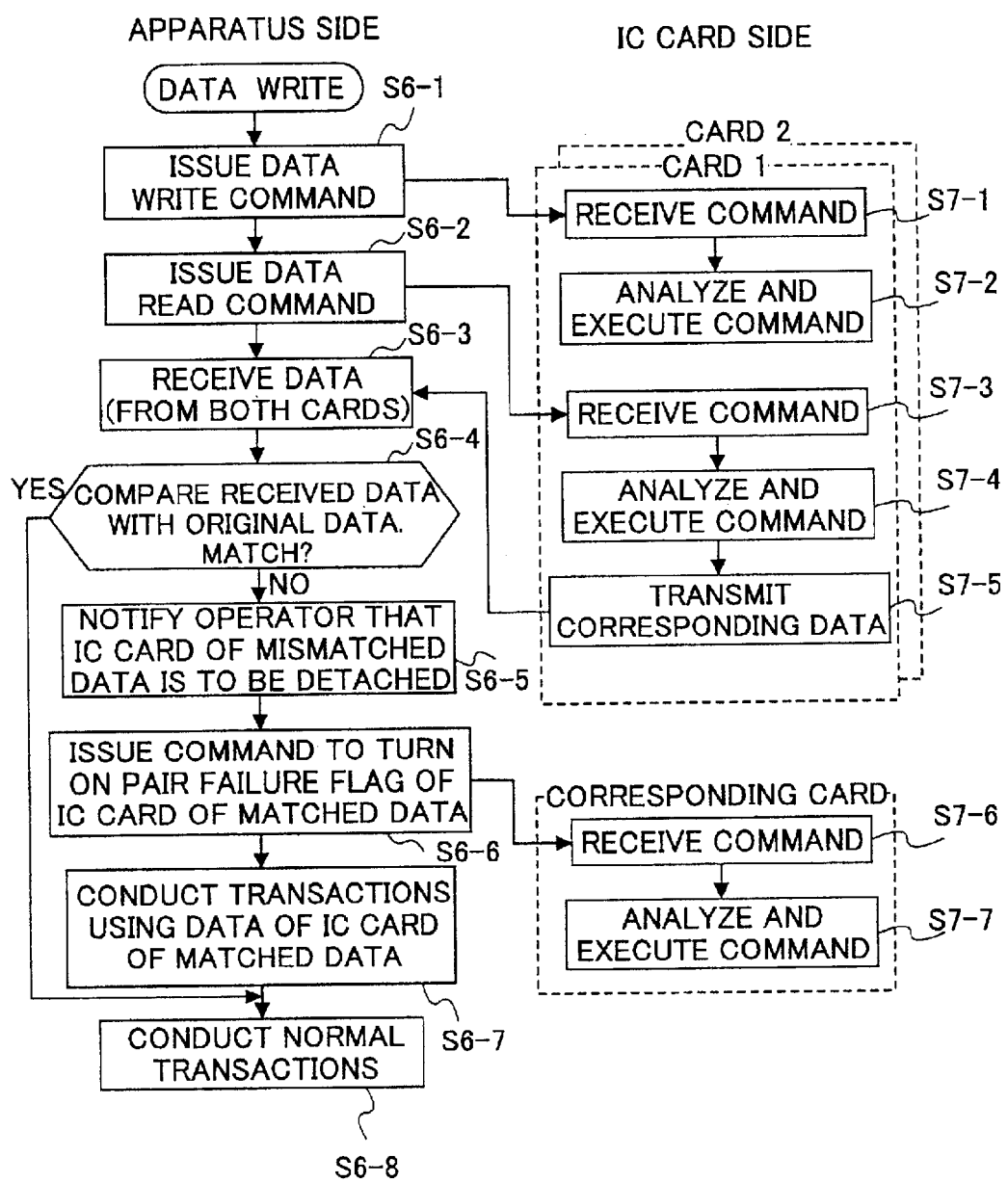
FIG. 15 is a flowchart of a data write operation according to the first embodiment of the present invention.

FIG. 15 is a flowchart of the data write operation of the first embodiment of the present invention.

In writing data to the paired IC cards 17-1 and 17-2, first, in step S6-1, the electronic money management apparatus 16 issues a data write command to each of the IC cards 17-1 and 17-2. In step S7-1, each of the IC cards 17-1 and 17-2 receives the data write command. After receiving the data write command, in step S7-2, each of the IC cards 17-1 and 17-2 analyzes the command and performs data writing (a data write operation).

After issuing the data write command to each of the IC cards 17-1 and 17-2 in step S6-1, in step S6-2, the electronic money management apparatus 16 issues a data read command to each of the IC cards 17-1 and 17-2. In step S7-3, each of the IC cards 17-1 and 17-2 receives the data read command. After receiving the data read command, in step S7-4, each of the IC cards 17-1 and 17-2 analyzes the received command and performs data reading (a data read operation). After reading data in accordance with the received command in step S7-4, in step S7-5, each of the IC cards 17-1 and 17-2 transmits the read-out data to the electronic money management apparatus 16.

In step S6-3, the electronic money management apparatus 16 receives the data transmitted from each of the IC cards 17-1 and 17-2. In step S6-4, the electronic money management apparatus 16 compares the data received from the IC cards 17-1 and 17-2 with their respective original data.

If the comparison results of step S6-4 show that each of the IC cards 17-1 and 17-2 has its data matched, in step S6-8, the electronic money management apparatus 16 conducts normal transactions. If the comparison results of step S6-4 show that the data of the IC card 17-1 are not matched, in step S6-5, the electronic money management apparatus 16 notifies the operator that the IC card 17-1 is to be detached.

Further, in step S6-6, the electronic money management apparatus 16 issues a command to turn ON the pair failure flag of the IC card 17-2 whose data are shown as matched in the comparison result of step S6-4. The pair failure flag is a flag that is turned ON if the pair IC card has a failure.

After receiving the command in step S7-6, in step S7-7, the IC card 17-2 analyzes the received command and turns ON the pair failure flag.

In step S6-7, the electronic money management apparatus 16 enables the IC card 17-2 whose data are shown as matched in the comparison results of step S6-4, and in step S6-8, the electronic money management apparatus 16 conducts normal transactions.

Next, a description will be given of an IC card check operation that the electronic money management apparatus 16 performs at given intervals during its normal operation.

Figure 16:
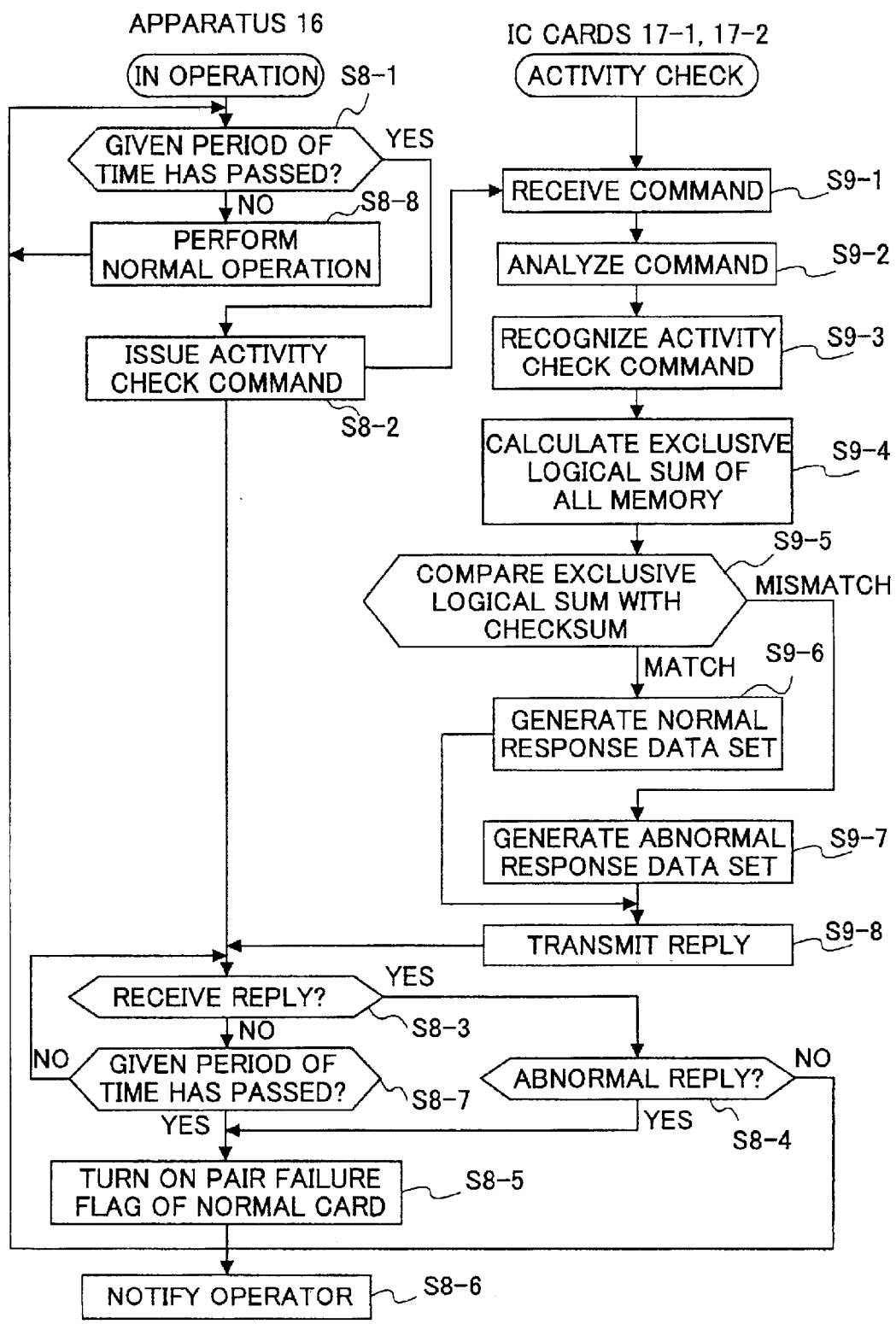
FIG. 16 is a flowchart of an activity check operation according to the first embodiment of the present invention.

FIG. 16 is a flowchart of the activity check operation of the first embodiment of the present invention.

In step S8-1, it is determined whether a given period of time has passed. After the given period of time has passed, step S8-2 is performed. In step S8-2, the electronic money management apparatus 16 issues an activity check command to each of the IC cards 17-1 and 17-2. The activity check command is a command to check whether the data of each of the IC cards 17-1 and 17-2 loaded in the electronic money management apparatus 16 is active or inactive.

Each of the IC cards 17-1 and 17-2 receives the command issued, in step S8-2, from the electronic money management apparatus 16. After each of the IC cards 17-1 and 17-2 receives the command in step S9-1, step S9-2 is performed. In step S9-2, each of the IC cards 17-1 and 17-2 analyzes the command.

After each of the IC cards 17-1 and 17-2 analyzes the command in step S9-2, step S9-3 is performed. In step S9-3, each of the IC cards 17-1 and 17-2 recognizes the activity check command from the result of analyzing the command in step S9-2. After each of the IC cards 17-1 and 17-2 recognizes the activity check command in step S9-3 as a result of analyzing the command, step S9-4 is performed. In step S9-4, each of the IC cards 17-1 and 17-2 calculates the exclusive logical sum of all of its stored data.

After each of the IC cards 17-1 and 17-2 calculates the exclusive logical sum of all of its stored data in step S9-4, step S9-5 is performed. In step S9-5, each of the IC cards 17-1 and 17-2 compares the exclusive logical sum of all of its data calculated in step S9-4 with its checksum data.

If the exclusive logical sum of all of the data matches the checksum data in step S9-5, step S9-6 is performed. In step S9-6, a normal response data set is generated.

If the exclusive logical sum of all of the data does not match the checksum data in step S9-5, step S9-7 is performed. In step S9-7, an abnormal response data set is generated.

After the normal response data set is generated in step S9-6 or the abnormal response data set is generated in step S9-7, step S9-8 is performed. In step S9-8, each of the IC cards 17-1 and 17-2 transmits a reply to the electronic money management apparatus 16.

After the electronic money management apparatus 16 issues the activity check command in step S8-2, step S8-3 is performed. In step S8-3, it is determined whether the electronic money management apparatus 16 has received the reply from each of the IC cards 17-1 and 17-2.

After the electronic money management apparatus 16 receives the reply from each of the IC cards 17-1 and 17-2 in step S8-3, step S8-4 is performed. In step S8-4, it is determined whether each of the replies received from the IC cards 17-1 and 17-2 is abnormal.

If the replies received from the IC cards 17-1 and 17-2 are normal in step S8-4, it can be determined that the IC cards 17-1 and 17-2 are operating normally. Therefore, the operation returns to step S8-1 and the normal operation is performed.

If either one of the replies received from the IC cards 17-1 and 17-2 is abnormal in step S8-4, it can be determined that the corresponding one of the IC cards 17-1 and 17-2 has an abnormality. In this case, step S8-5 is performed. In step S8-5, the electronic money management apparatus 16 issues a command to turn ON the pair failure flag of the normal one of the IC cards 17-1 and 17-2.

After issuing the command to turn ON the pair failure flag of the normal one of the IC cards 17-1 and 17-2 in step S8-5, in step S8-6, the electronic money management apparatus 16 notifies the operator that the one of the IC cards 17-1 and 17-2 has an abnormality.

If no reply is returned in step S8-3, step S8-7 is performed. In step S8-7, it is determined whether a given period of time has passed. If the given period of time has not passed in step S8-7, the operation returns to step S8-3 to detect reception of the replies. If the given period of time has passed in step S8-7 without receiving the reply from, for instance, the IC card 17-1, it can be determined that the IC card 17-1 has an abnormality. Therefore, in step S8-5, the electronic money management apparatus 16 issues the command to turn ON the pair failure flag of the normal one of the IC cards 17-1 and 17-2, that is, the IC card 17-2 in this case, and in step S8-6, the electronic money management apparatus 16 notifies the operator that the IC card 17-1 has an abnormality.

As described above, the activity check is performed on the IC cards 17-1 and 17-2 during normal operation, and once an abnormality is detected in either of the IC cards 17-1 and 17-2, the operator is notified of the abnormality so that the abnormality can be treated immediately. Thereby, the reliability of the data can be improved.

Here, a description will be given of commands transmitted from the electronic money management apparatus 16 to each of the IC cards 17-1 and 17-2.

FIG. 17 is a diagram for illustrating the commands transmitted from the electronic money management apparatus 16 to each of the IC cards 17-1 and 17-2 according to the first embodiment of the present invention.

As shown in FIG. 17, the commands transmitted from the electronic money management apparatus 16 to each of the IC cards 17-1 and 17-2 are composed mainly of read commands and write commands.

The read commands include a card characteristic number area read command, a card number registration area read command, an apparatus number registration area read command, a version number management area read command, a pair failure flag setting area read command, an UNUSED flag area read command, an INVALID flag area read command, a value data area read command, a transaction history area read command, a checksum data area read command, a memory read command, and a CPU register read command.

The card characteristic number area read command is a command to read the card characteristic number stored in the card characteristic number area 17a of the nonvolatile memory 14. The card number registration area read command is a command to read the pair card characteristic number stored in the card number registration area 17b. The apparatus number registration area read command is a command to read the apparatus number stored in the apparatus number registration area 17c. The version number management area read command is a command to read the version information stored in the version number management area 17d. The pair flag failure setting area read command is a command to read the pair failure flag stored in the pair flag failure setting area 17e. The UNUSED flag area read command is a command to read the UNUSED flag stored in the UNUSED flag area 17f. The INVALID flag area read command is a command to read the INVALID flag stored in the INVALID flag area 17g. The value data area read command is a command to read the value data stored in the value data area 17h. The transaction history area read command is a command to read the transaction history information stored in the transaction history area 17i. The checksum data area read command is a command to read the checksum data store in the checksum data area 17j. The memory read command is a command to read data of a specified address and length from the nonvolatile memory 14 or the volatile memory 15 of the IC card 17-1 or 17-2. When the memory read command is issued, the address and length of data to be read are specified. The CPU register read command is a command to read data from a register provided in the CPU 13. When the CPU register read command is issued, the name of a register to be read is specified.

In each of the above-described commands, each of the IC cards 17-1 and 17-2 returns corresponding data.

The write commands include a card number registration area write command, an apparatus number registration area write command, a version number management area write command, a pair failure flag setting area write command, an UNUSED flag area write command, an INVALID flag area write command, a value data area write command, a transaction history area write command, a checksum data area write command, a memory write command, a CPU register write command, and the activity check command.

The card number registration area write command is a command to write the card characteristic number to the card number registration area 17b. The apparatus number registration area write command is a command to write the apparatus number to the apparatus number registration area 17c. The version number management area write command is a command to write the version information to the version number management area 17d. The pair failure flag setting area write command is a command to write the pair failure flag to the pair failure flag setting area 17e. The UNUSED flag area write command is a command to write the UNUSED flag to the UNUSED flag area 17f. The INVALID flag area write command is a command to write the INVALID flag to the INVALID flag area 17g. The value data area write command is a command to write the value data to the value data area 17h. The transaction history area write command is a command to write the transaction history information to the transaction history area 17i. The checksum data area write command is a command to write the checksum data to the checksum data area 17j. The memory write command is a command to write data of a specified address and length to the nonvolatile memory 14 or the volatile memory 15 of the IC card 17-1 or 17-2. When the memory write command is issued, the address and length of data to be written are specified. The CPU register write command is a command to write data to a register provided in the CPU 13. When the CPU register write command is issued, the name of a register to which the data is to be written is specified. The activity check command is a command to execute an activity check.

Each of the IC cards 17-1 and 17-2 makes a response indicating normal completion of writing or an abnormal end to each of the above-described write commands.

Figure 18:
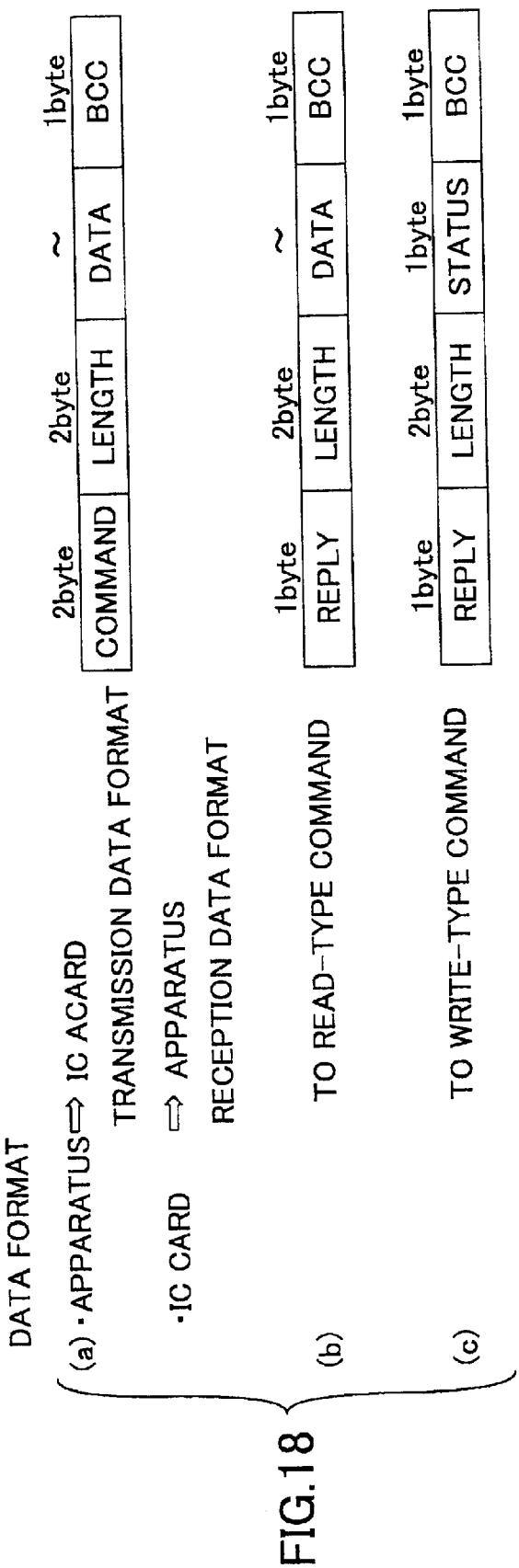
FIG. 18 is a diagram showing data formats of data communicated between the electronic money management apparatus and the IC card according to the first embodiment of the present invention.

FIG. 18 is a diagram showing data formats of data communicated between the electronic money management apparatus 16 and each of the IC cards 17-1 and 17-2 according to the first embodiment of the present invention.

In FIG. 18, (a) indicates the format of data transmitted from the electronic money management apparatus 16 to each of the IC cards 17-1 and 17-2, (b) indicates the format of data transmitted, in response to a read-type command, from each of the IC cards 17-1 and 17-2 to the electronic money management apparatus 16, and (c) indicates the format of data transmitted, in response to a write-type command, from each of the IC cards 17-1 and 17-2 to the electronic money management apparatus 16.

In this embodiment, one piece of value data is stored and managed in the IC cards 17-1 and 17-2. However, one piece of value data may be stored and managed in a plurality of data blocks.

Figure 19:
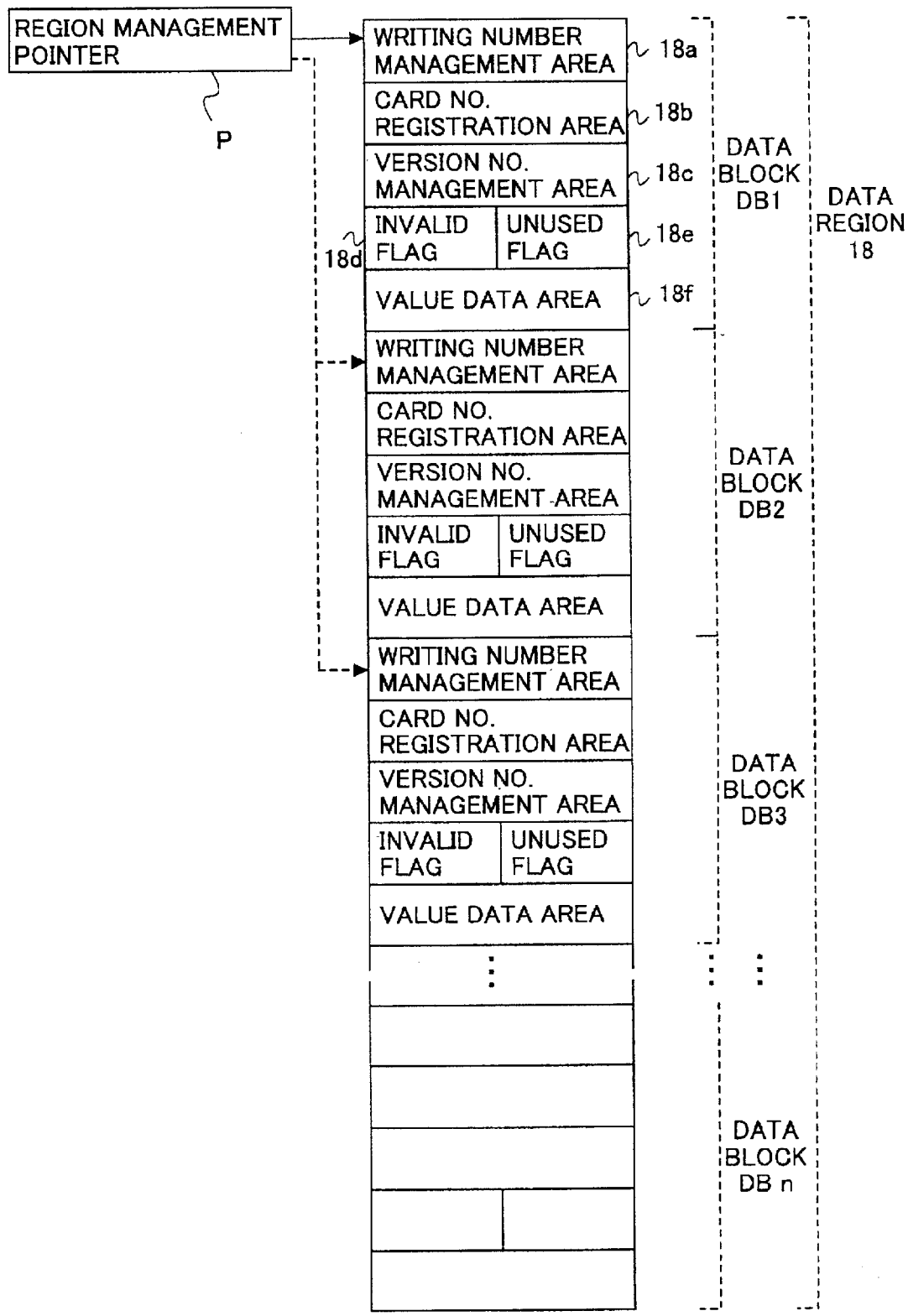
FIG. 19 is a diagram for illustrating a data management structure of the IC card according to a first variation of the first embodiment of the present invention.

FIG. 19 is a diagram for illustrating a data management structure of the IC card according to a first variation of the first embodiment of the present invention.

The nonvolatile memory 14 of each of the IC cards 17-1 and 17-2 has a data region 18 divided into a plurality of data blocks DB1 through DBn. Each of the data blocks DB1 through DBn is composed of a writing number management area 18a, a card number registration area 18b, a version number management area 18c, an INVALID flag area 18d, an UNUSED flag area 18e, and a value data area 18f.

The writing number management area 18a stores the number of times writing is performed to a data block. The card number registration area 18b, which corresponds to the card number registration area 17b of FIG. 3, stores the pair IC card characteristic number.

The version number management area 18c, which corresponds to the version number management area 17d of FIG. 3, stores the version information. The INVALID flag area 18d, which corresponds to the INVALID flag area 17g of FIG. 3, stores the INVALID flag. The UNUSED flag area 18e, which corresponds to the UNUSED flag area 17f of FIG. 3, stores the UNUSED flag. The value data area 18f, which corresponds to the value data area 17h of FIG. 3, stores the value data.

The nonvolatile memory 14 has its region to be used managed by a region management pointer P.

The region management pointer P is information indicating the base address of each of the data blocks DB1 through DBn.

Next, a description will be given of an operation of the IC card in which the value data is managed as shown in FIG. 19.

Figure 20:
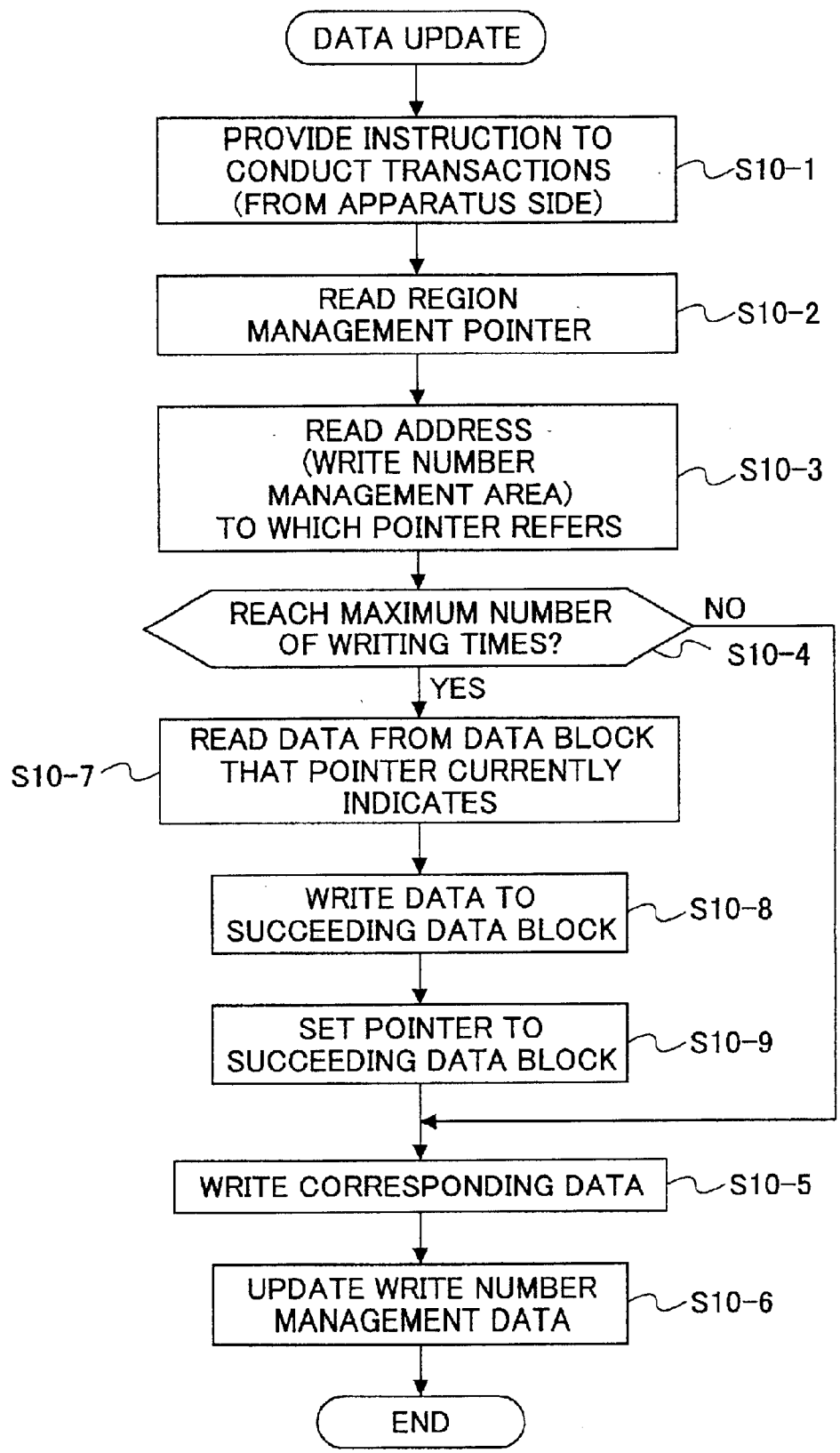
FIG. 20 is a flowchart of an operation of managing the nonvolatile memory of the IC card according to the first variation of the first embodiment of the present invention.

FIG. 20 is a flowchart of the operation of managing the nonvolatile memory 14 of the IC card according to the first variation of the first embodiment of the present invention.

In step S10-1, the electronic money management apparatus 16 provides an instruction to conduct transactions to each of the IC card 17-1 and 17-2. After the electronic money management apparatus 16 provides the instruction to conduct transactions to each of the IC card 17-1 and 17-2 in step S10-1, step S10-2 is performed. In step S10-2, each of the IC cards 17-1 and 17-2 reads the region management pointer P.

After each of the IC cards 17-1 and 17-2 reads the present region management pointer P in step S10-2, step S10-3 is performed. In step S10-3, each of the IC cards 17-1 and 17-2 reads the base address of one of the data blocks DB1 through DBn to which one the region management pointer P refers, that is, each of the IC cards 17-1 and 17-2 reads information on the number of times writing is performed (writing number information) stored in the writing number management area 18a of the one of the data blocks DB1 through DBn.

After each of the IC cards 17-1 and 17-2 reads the writing number information stored in the writing number management area 18a, step S10-4 is performed. In step S10-4, it is determined whether the writing number information read from the writing number management area 18a of each of the IC cards 17-1 and 17-2 reaches a preset given number limitation value (the maximum number of times writing is performable to each of the data blocks DB1 through DBn). The number limitation value is determined by the number of times writing is performable to the nonvolatile memory 14.

If the read-out writing number information has not reached the given number limitation value according to the determination result of step S10-4, it can be determined that the value data of the corresponding data block (the one of the data block DB1 through DBn) can be updated. Therefore, next, step S10-5 is performed. In step S10-5, value data is written to the data block that the region management pointer P indicates in each of the IC cards 17-1 and 17-2.

After the value data is written to the data block that the region management pointer P indicates in step S10-5, step S10-6 is performed. In step S10-6, each of the IC cards 17-1 and 17-2 increments the writing number information stored in the writing number management area 18a by one (+1).

If the read-out writing number information reaches the given number limitation value according to the determination results of step S10-4, the value data of the data block cannot be further updated with reliability. Therefore, next, step S10-7 is performed. In step S10-7, each of the IC cards 17-1 and 17-2 reads out the value data of the data block that the region management pointer P indicates.

After each of the IC cards 17-1 and 17-2 reads out the value data of the data block which the region management pointer P indicates in step S10-7, step S10-8 is performed. In step S10-8, each of the IC cards 17-1 and 17-2 writes the value data read out in step S10-7 to a data block succeeding the data block that the region management pointer P indicates.

After each of the IC cards 17-1 and 17-2 writes the value data read out in step s10-7 to a data block succeeding the data block that the region management pointer P indicates in step S10-8, step S10-9 is performed. In step S10-9, each of the IC cards 17-1 and 17-2 sets the region management pointer P to the succeeding data block.

After each of the IC cards 17-1 and 17-2 sets the region management pointer P to the succeeding data block in step S10-9, steps S10-5 and S10-6 are performed.

Therefore, the number of times the value data of the nonvolatile memory 14 of each of the IC cards 17-1 and 17-2 can be updated is the product of "the maximum number of times writing is performable to each data block" and "the number of data blocks". Thereby, the nonvolatile memory 14 of each of the IC cards 17-1 and 17-2 can be used effectively.

In this variation, a single pair of IC cards (that is, the paired IC cards 17-1 and 17-2) is assigned to one customer. However, a single pair of IC cards may be assigned to a plurality of customers.

Figure 21:
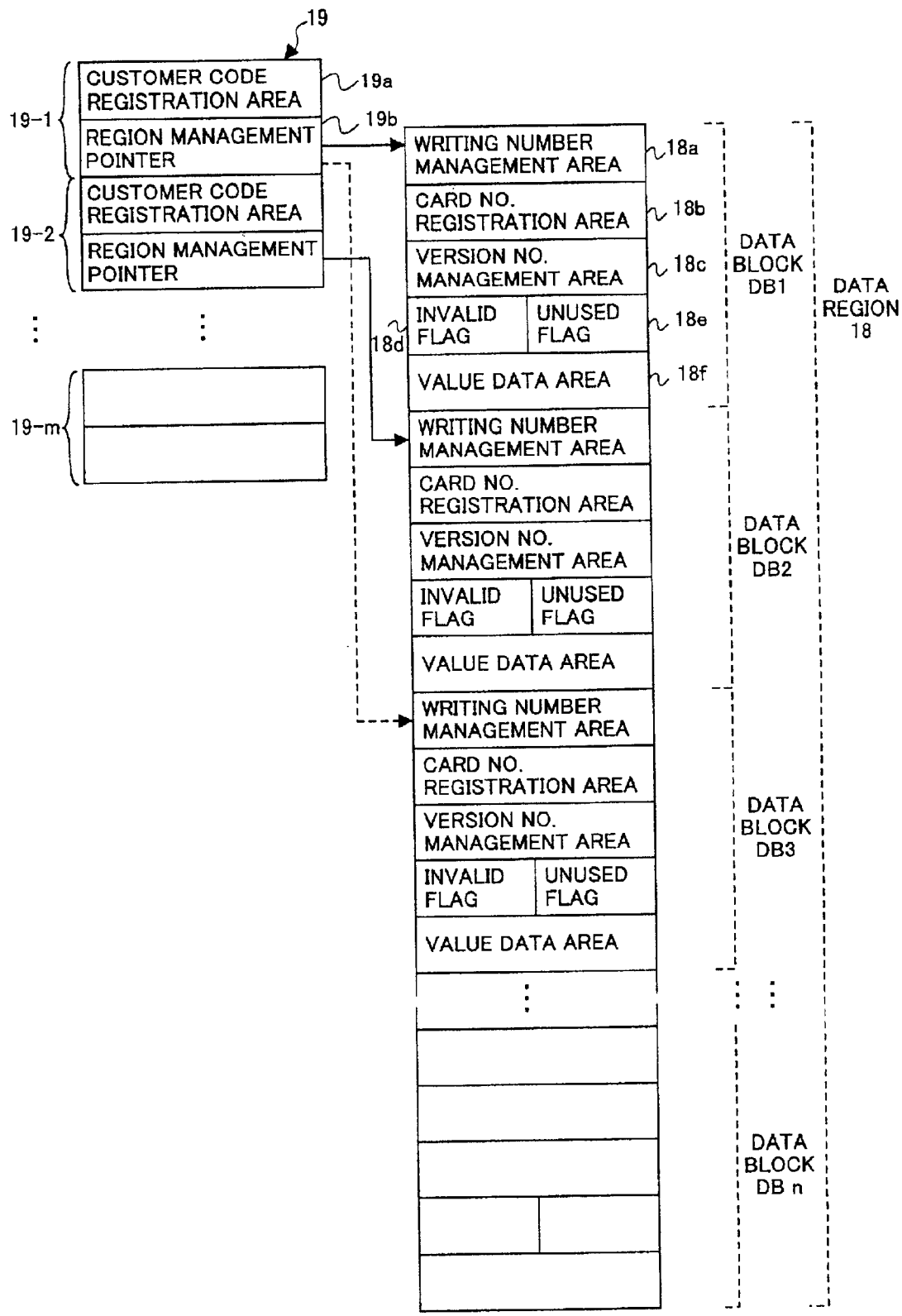
FIG. 21 is a diagram showing a data configuration of the nonvolatile memory of the IC card according to a second variation of the first embodiment of the present invention.

FIG. 21 is a diagram showing a data configuration of the nonvolatile memory 14 of the IC card according to a second variation of the first embodiment of the present invention. In FIG. 21, the same elements as those of FIG. 19 are referred to by the same numerals, and a description thereof will be omitted.

In the second variation, the nonvolatile memory 14 includes a customer code area 19. The customer code area 19 is composed of a plurality of customer code registration parts 19-1 through 19-m. The customer code registration parts 19-1 through 19-m are set for respective customers.

Each of the customer code registration parts 19-1 through 19-m is composed of a customer code registration area 19a and a region management pointer 19b. The customer code registration area 19a stores a customer code preset for the corresponding customer.

The region management pointer 19b, which is set for the corresponding customer, stores the base address of the corresponding one of the data blocks DB1 through DBn storing the value data of the customer of the customer code stored in the customer code registration area 19a.

Next, a description will be given of an operation of the IC card in which the value data is managed as shown in FIG. 21.

Figure 22:
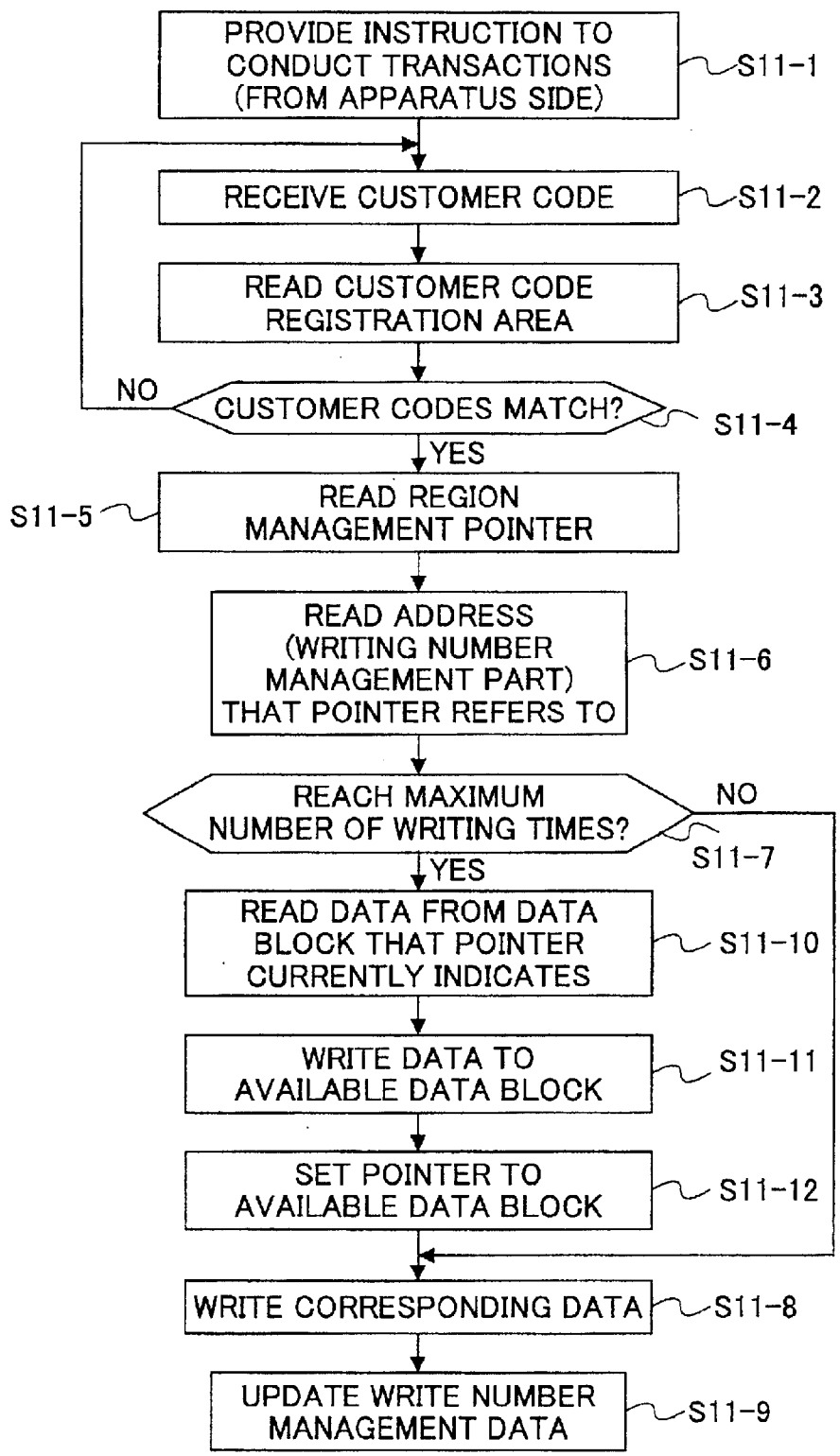
FIG. 22 is a flowchart of an operation of managing the nonvolatile memory of the IC card according to the second variation of the first embodiment of the present invention.

FIG. 22 is a flowchart of the operation of managing the nonvolatile memory 14 of the IC card according to the second variation of the first embodiment of the present invention.

In step S11-1, the electronic money management apparatus 16 provides an instruction to conduct transactions to each of the IC cards 17-1 and 17-2. After the electronic money management apparatus 16 provides an instruction to conduct transactions to each of the IC cards 17-1 and 17-2 in step S11-1, step S11-2 is performed. In step S11-2, each of the IC cards 17-1 and 17-2 receives a customer code from the electronic money management apparatus 16.

After each of the IC cards 17-1 and 17-2 receives a customer code from the electronic money management apparatus 16 in step S11-2, step S11-3 is performed. In step S11-3, each of the IC cards 17-1 and 17-2 reads a customer code from the customer code registration area 19a of the customer code registration part 19-1. After each of the IC cards 17-1 and 17-2 reads a customer code from the customer code registration area 19a of the customer code registration part 19-1 in step S11-3, step S11-4 is performed. In step S11-4, it is determined whether the customer code supplied from the electronic money management apparatus 16 matches the customer code read from the customer code registration area 19a of the customer code registration part 19-1.

If the customer codes do not match, the operation returns to step S11-3 and each of the IC cards 17-1 and 17-2 reads a customer code from the customer code registration area 19a of the succeeding customer code registration part 19-2. The above-described steps S11-3 and S11-4 are repeated until the customer code supplied from the electronic money management apparatus 16 matches the customer code read from the customer code registration area 19a.

After the two customer codes match in step S11-4, step S11-5 is performed. In step S11-5, each of the IC cards 17-1 and 17-2 reads the region management pointer 19b of one of the customer code registration parts 19-1 through 19-n which one corresponds to the matched customer codes.

After each of the IC cards 17-1 and 17-2 reads the corresponding region management pointer 19b in step S11-5, step S11-6 is performed. In step S11-6, each of the IC cards 17-1 and 17-2 reads out the base address of one of the data blocks DB1 through DBn to which one the region management pointer 19b refers, that is, each of the IC cards 17-1 and 17-2 reads writing number information stored in the writing number management area 18a of the one of the data blocks DB1 through DBn.

After each of the IC cards 17-1 and 17-2 reads the writing number information stored in the writing number management area 18a of the one of the data blocks DB1 through DBn in step S11-6, step S11-7 is performed. In step S11-7, it is determined whether the writing number information read from the writing number management area 18a reaches a preset given number limitation value.

If the read-out writing number information has not reached the given number limitation value according to the determination result of step S11-7, it can be determined that the value data of the corresponding data block (the one of the data block DB1 through DBn) can be updated. Therefore, next, step S11-8 is performed. In step S11-8, value data is written to the data block that the region management pointer 19b indicates in each of the IC cards 17-1 and 17-2.

After the value data is written to the data block that the region management pointer 19b indicates in step S11-8, step S11-9 is performed. In step S11-9, each of the IC cards 17-1 and 17-2 increments the writing number information stored in the writing number management area 18a by one (+1).

If the read-out writing number information reaches the given number limitation value according to the determination results of step S11-7, the value data of the data block cannot be updated with reliability. Therefore, next, step S11-10 is performed. In step S11-10, each of the IC cards 17-1 and 17-2 reads out the value data of the data block that the region management pointer 19b indicates.

After each of the IC cards 17-1 and 17-2 reads out the value data of the data block that the region management pointer 19b indicates in step S11-10, step S11-11 is performed. In step S11-11, each of the IC cards 17-1 and 17-2 writes the value data read out in step S11-10 to an available one of the data blocks DB1 through DBn.

After each of the IC cards 17-1 and 17-2 writes the value data read out in step S11-10 to an available one of the data blocks DB1 through DBn in step S11-11, step S11-12 is performed. In step S11-12, each of the IC cards 17-1 and 17-2 sets the region management pointer 19b to the data block to which the value data is written in step S11-11.

After each of the IC cards 17-1 and 17-2 sets the region management pointer 19b to the data block in step S11-12, steps S11-8 and S11-9 are performed.

Thereby, a single pair of IC cards can be shared by a plurality of customers. Further, when the number of times writing is performed to a data block currently used reaches the maximum number of times writing is performable or the number limitation value, an available data block is used to update the value data. This improves the efficiency of use of the nonvolatile memory of each of the IC cards 17-1 and 17-2.

Further, by providing a customer code table in the electronic money management apparatus 16 and managing a plurality of customers in accordance with the customer code table, data on each customer can be duplicated in a different pair of IC cards.

Figure 23:
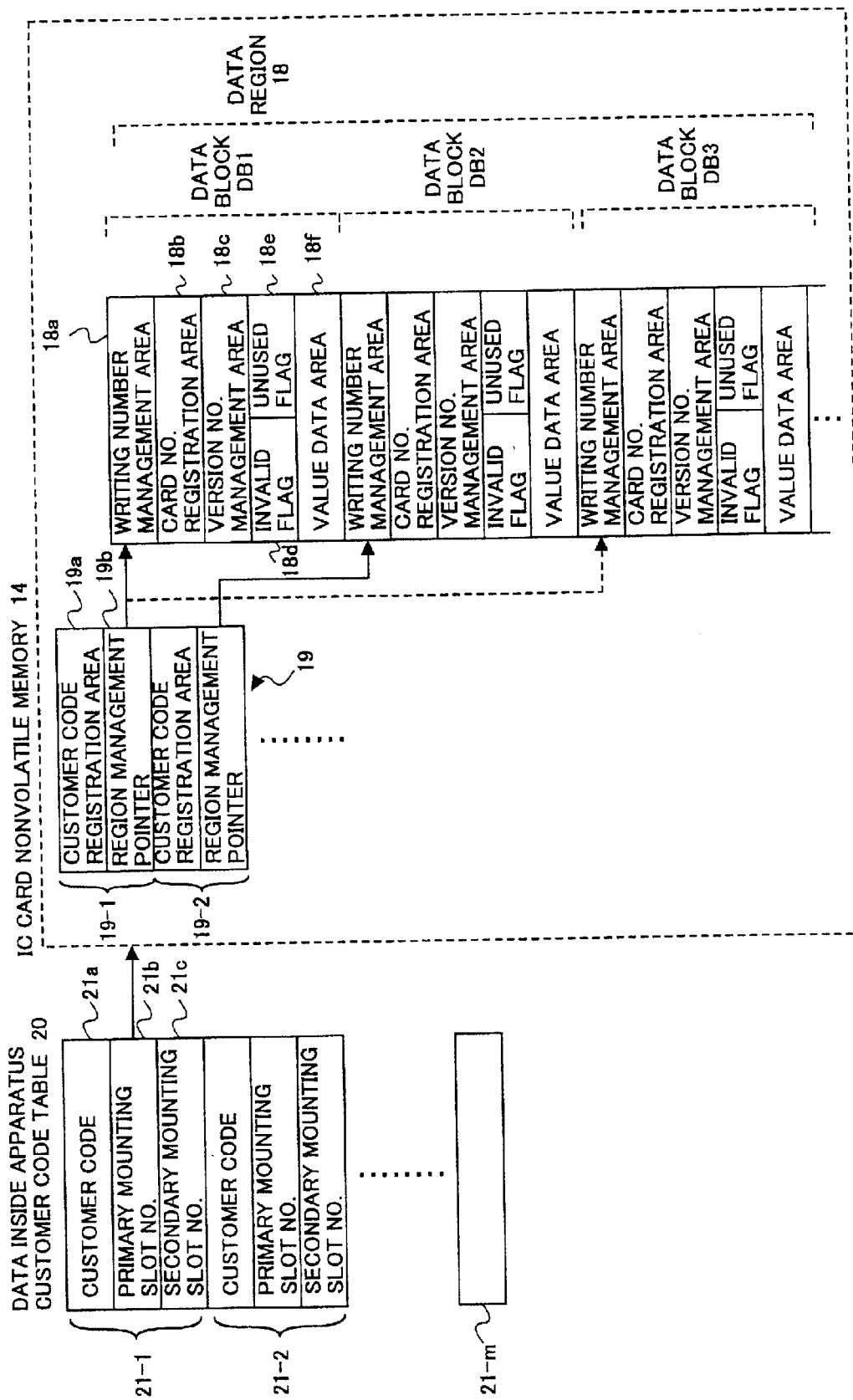
FIG. 23 is a diagram for illustrating a third variation of the first embodiment of the present invention.

FIG. 23 is a diagram for illustrating a third variation of the first embodiment of the present invention. In FIG. 23, the same elements as those of FIG. 21 are referred to by the same numerals, and a description thereof will be omitted.

In this variation, the electronic money management apparatus 16 includes a customer code table 20. The customer code table 20 is composed of a plurality of customer code registration parts 21-1 through 21-m. Each of the customer code registration parts 21-1 through 21-m is composed of a customer code registration area 21a, a primary mounting slot number registration area 21b, and a secondary mounting slot number registration area 21c.

The customer code registration area 21a stores a customer code. The primary mounting slot number registration area 21b and the secondary mounting slot number registration area 21c store the numbers of primary and secondary slots to which the IC cards 17-1 and 17-2 storing the value data of the customer of the customer code stored in the customer code registration area 21a are attached, respectively.

Next, a description will be given of an operation of the electronic money management apparatus 16 in the case of employing the data management structure of FIG. 23.

Figure 24:
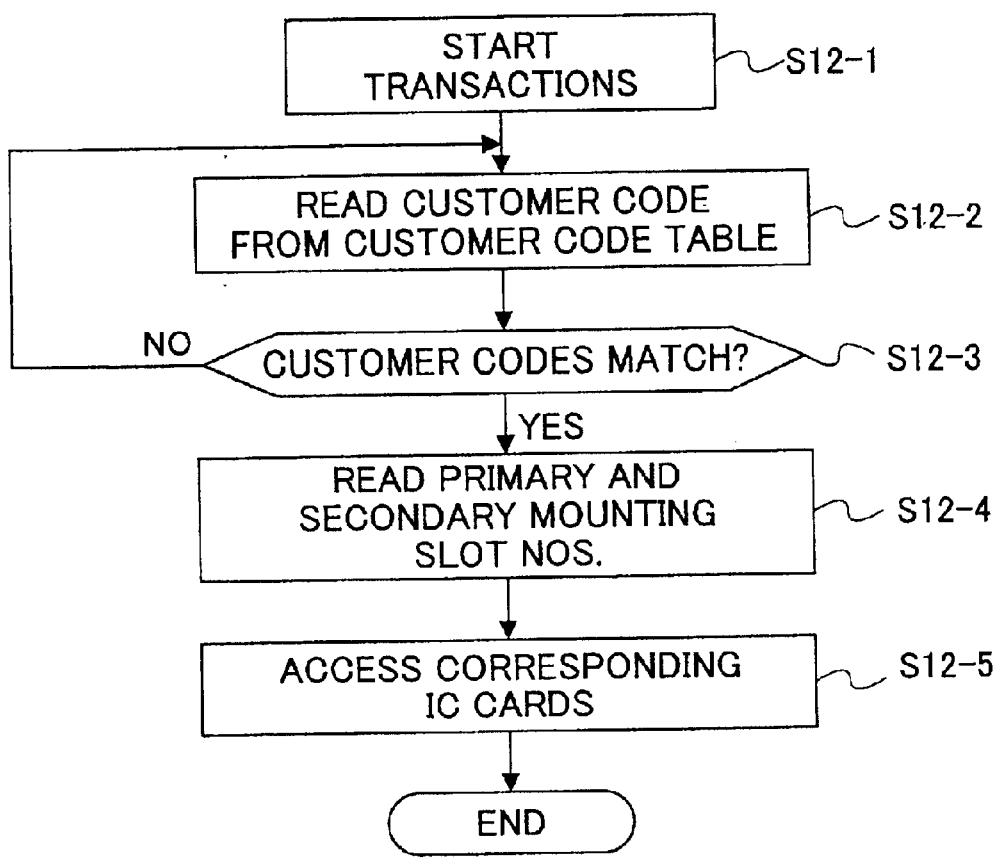
FIG. 24 is a flowchart of an operation of managing the nonvolatile memory of the IC card according to the third variation of the first embodiment of the present invention.

FIG. 24 is a flowchart of the operation of the electronic money management apparatus 16 for managing the nonvolatile memory 14 of the IC card according to the third variation of the first embodiment of the present invention.

In step S12-1, transactions are started. When the transactions are started in step S12-1, the customer code of a customer to conduct the transactions is supplied to the electronic money management apparatus 16. After the transactions are started and the customer code of the customer is supplied to the electronic money management apparatus 16, step S12-2 is performed. In step S12-2, the electronic money management apparatus 16 reads out the customer code from the customer code registration area 21a of the customer code registration part 21-1 of the customer code table 20.

After the electronic money management apparatus 16 reads out the customer code from the customer code registration area 21a of the customer code registration part 21-1 of the customer code table 20 in step S12-2, step S12-3 is performed. In step S12-3, it is determined whether the customer code supplied to the electronic money management apparatus 16 matches the customer code read from the customer code registration area 21a of the customer code registration part 21-1 of the customer code table 20.

If the customer codes do not match in step S12-3, the operation returns to step S12-2 and the electronic money management apparatus 16 reads a customer code from the customer code registration area 21a of the succeeding customer code registration part 21-2. Thereafter, step S12-3 is performed. The above-described steps S12-2 and S12-3 are repeated until the customer code supplied to the electronic money management apparatus 16 matches the customer code read from the customer code registration area 21a.

If the customer codes match in step S12-3, step S12-4 is performed. In step S12-4, the electronic money management apparatus 16 reads a primary mounting slot number and a secondary mounting slot number from the primary mounting slot number registration area 21b and the secondary mounting slot number registration area 21c of one of the customer code registration parts 21-1 through 21-m which one corresponds to the matched customer codes.

After the electronic money management apparatus 16 reads the primary and secondary mounting slot numbers from the primary and secondary mounting slot number registration areas 21b and 21c, respectively, of the corresponding customer code registration part, step S12-5 is performed. In step S12-5, the electronic money management apparatus 16 accesses the IC cards 17-1 and 17-2 that are attached, respectively, to the primary and secondary mounting slots of the primary and secondary mounting slot numbers read out in step S12-4.

Thereby, data on each customer can be duplicated in a different pair of IC cards.

In the first embodiment, data duplication is performed between the two IC cards 17-1 and 17-2. However, data triplication is also performable by storing the data stored in each of the IC cards 17-1 and 17-2 in the nonvolatile memory 7 of the electronic money management apparatus 16.

Figure 25:
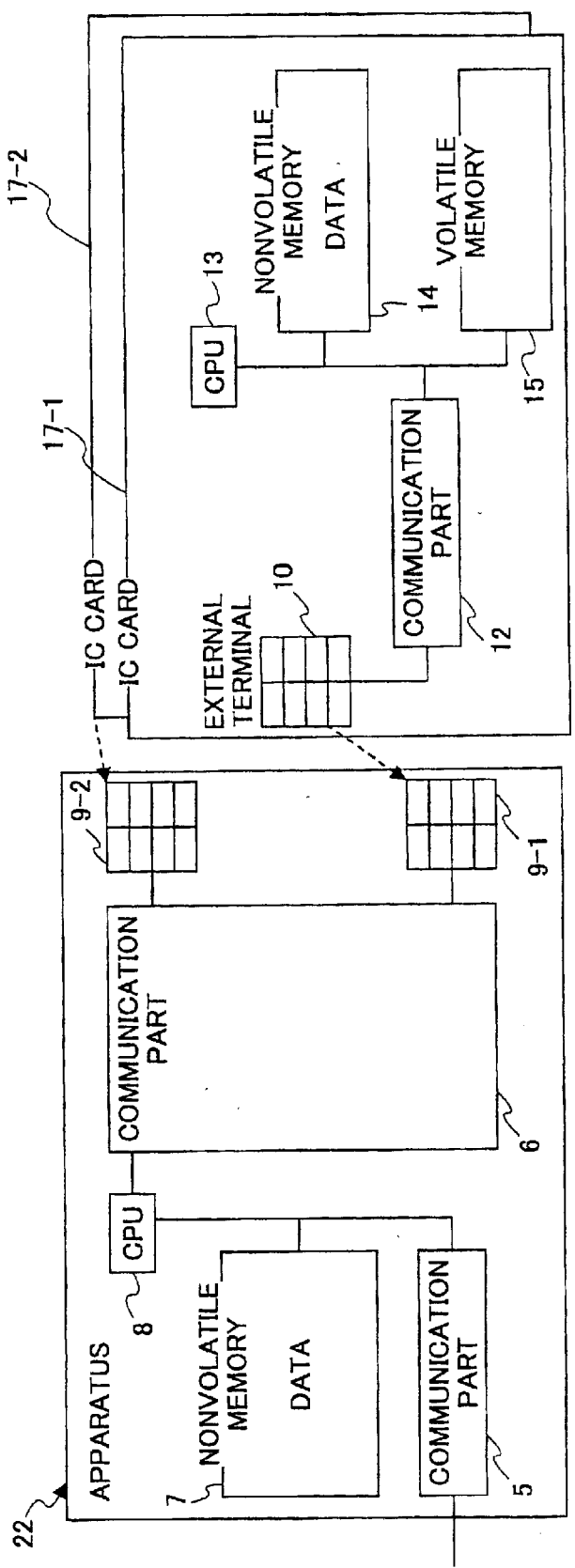
FIG. 25 is a block diagram showing a second embodiment of the present invention.

FIG. 25 is a block diagram showing a second embodiment of the present invention. In FIG. 25, the same elements as those of FIG. 2 are referred to by the same numerals, and a description thereof will be omitted.

An electronic money management apparatus 22 of this embodiment stores in the nonvolatile memory 7 the same data as stored in each of the IC cards 17-1 and 17-2.

In the case of reading the data from each of the IC cards 17-1 and 17-2, for instance, each of the IC cards 17-1 and 17-2 reads the data from the nonvolatile memory 14 and supplies the read-out data to the electronic money management apparatus 22. The electronic money management apparatus 22 compares the data read from the nonvolatile memory 14 of each of the IC cards 17-1 and 17-2 with the data stored in the nonvolatile memory 7 contained in the electronic money management apparatus 22, following a procedure, for instance, as shown in FIGS. 4A through 4D. Thereby, the electronic money management apparatus 22 determines whether each of the IC cards 17-1 and 17-2 is in a normal or abnormal state. If each of the IC cards 17-1 and 17-2 is in or recovered to a normal state, the electronic money management apparatus 22 performs the normal operation.

In the case of writing data, the same data is written to the nonvolatile memories 14 of the IC cards 17-1 and 17-2 and to the nonvolatile memory 7 of the electronic money management apparatus 22.

Further, the nonvolatile memory 14 of each of the IC cards 17-1 and 17-2 may be duplicated.

Figure 26:
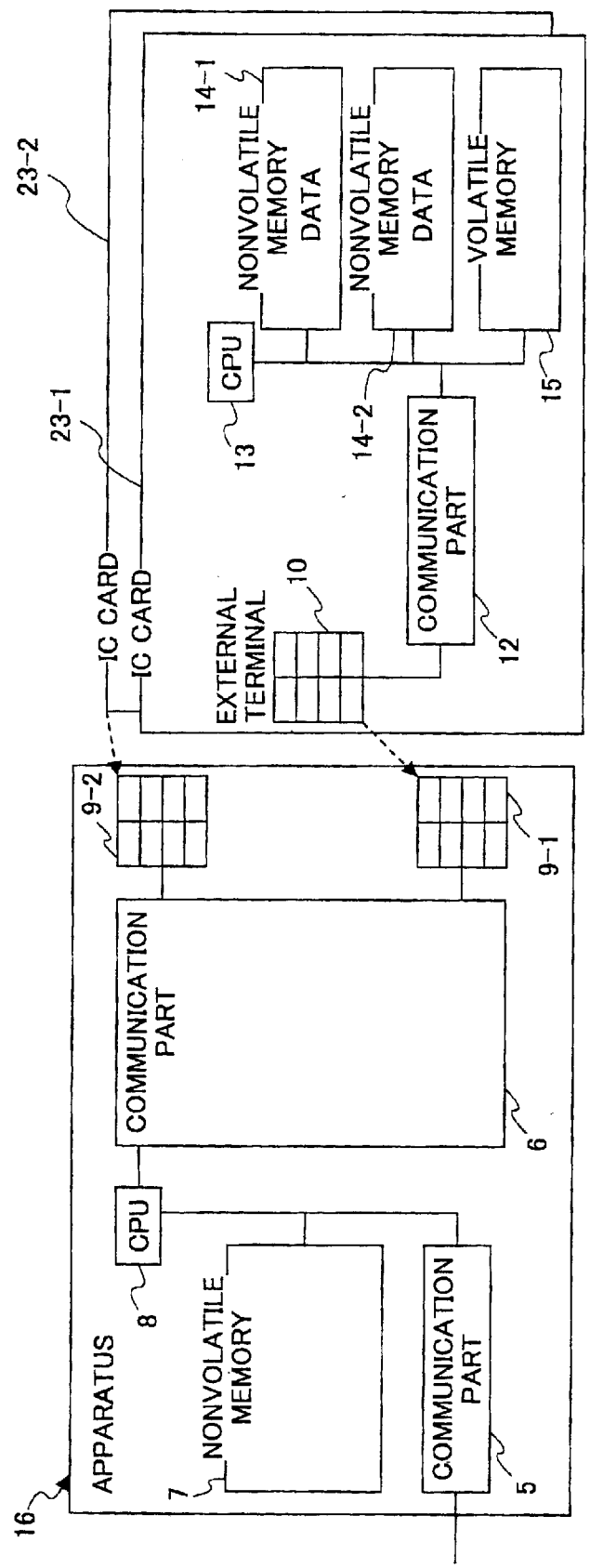
FIG. 26 is a block diagram showing a third embodiment of the present invention.

FIG. 26 is a block diagram showing a third embodiment of the present invention. In FIG. 26, the same elements as those of FIG. 2 are referred to by the same numerals, and a description thereof will be omitted.

Each of IC cards 23-1 and 23-2 of this embodiment includes two nonvolatile memories 14-1 and 14-2. The nonvolatile memories 14-1 and 14-2 are each composed of an independent memory chip and can be subjected to data reading and writing independently of each other.

A description will be given of a data read operation according to this embodiment.

The electronic money management apparatus 16 reads data from each of the nonvolatile memories 14-1 and 14-2 of the IC card 23-1 and compares the data of the nonvolatile memory 14-1 and the data of the nonvolatile memory 14-2. If there is consistency between the read-out data, the electronic money management apparatus 16 enables the data of the IC card 23-1 to be used. Likewise, the electronic money management apparatus 16 reads and compares data from each of the nonvolatile memories 14-1 and 14-2 of the IC card 23-2. If there is consistency between the read-out data, the electronic money management apparatus 16 enables the data of the IC card 23-2 to be used. After the electronic money management apparatus 16 enables the data of each of the IC cards 23-1 and 23-2 to be used, an operation as shown in FIGS. 4A through 4D is performed so that transactions using the IC cards 23-1 and 23-2 are enabled.

Here, the electronic money management apparatus 16 performs the operation of detecting consistency between the data of the nonvolatile memory 14-1 and the data of the nonvolatile memory 14-2. However, each of the IC cards 23-1 and 23-2 may detect data consistency between the nonvolatile memories 14-1 and 14-2.

In this case, the electronic money management apparatus 16 issues a read command to each of the IC cards 23-1 and 23-2. Each of the IC cards 23-1 and 23-2 reads data from its own nonvolatile memories 14-1 and 14-2 in response to the read command and determines whether the data match each other. Each of the IC cards 23-1 and 23-2 notifies the electronic money management apparatus 16 that the data is normal if the data of the nonvolatile memories 14-1 and 14-2 match each other. If the data of the nonvolatile memories 14-1 and 14-2 do not match each other, each of the IC cards 23-1 and 23-2 notifies the electronic money management apparatus 16 that the data includes an abnormality.

Next, a description will be given of a data write operation according to this embodiment.

The electronic money management apparatus 16 writes data to each of the nonvolatile memories 14-1 and 14-2 of the IC card 23-1. Then, the electronic money management apparatus 16 reads the data written to the nonvolatile memories 14-1 and 14-2 and compares the read-out data. If the data of the nonvolatile memory 14-1 matches the data of the nonvolatile memory 14-2, the electronic money management apparatus 16 determines that the data is normally written to the IC card 23-1. If the data of the nonvolatile memory 14-1 does not match the data of the nonvolatile memory 14-2, the electronic money management apparatus 16 determines that the IC card 23-1 has an abnormality.

Likewise, the electronic money management apparatus 16 writes data to each of the nonvolatile memories 14-1 and 14-2 of the IC card 23-2. Then, the electronic money management apparatus 16 reads the data written to the nonvolatile memories 14-1 and 14-2 and compares the read-out data. If the data of the nonvolatile memory 14-1 matches the data of the nonvolatile memory 14-2, the electronic money management apparatus 16 determines that the data is normally written to the IC card 23-2. If the data of the nonvolatile memory 14-1 does not match the data of the nonvolatile memory 14-2, the electronic money management apparatus 16 determines that the IC card 23-2 has an abnormality.

When the data is normally written to each of the IC cards 23-1 and 23-2, the electronic money management apparatus 16 determines that the write operation is normally completed.

Here, the electronic money management apparatus 16 determines whether the data is normally written to each of the nonvolatile memories 14-1 and 14-2 of each of the IC cards 23-1 and 23-2. However, each of the IC cards 23-1 and 23-2 may determine whether its own data is normally written and notify the electronic money management apparatus 16 of the determination result.

In this case, the electronic money management apparatus 16 issues a write command to each of the IC cards 23-1 and 23-2. Each of the IC cards 23-1 and 23-2 writes data to each of the nonvolatile memories 14-1 and 14-2. After writing the data to each of the nonvolatile memories 14-1 and 14-2, each of the IC cards 23-1 and 23-2 reads the written data from the nonvolatile memories 14-1 and 14-2 and determines whether the read-out data match each other. If each of the IC cards 23-1 and 23-2 determines that the read-out data match each other, each of the IC cards 23-1 and 23-2 notifies the electronic money management apparatus 16 that the data is normally written. If the read-out data do not match each other, each of the IC cards 23-1 and 23-2 notifies the electronic money management apparatus 16 that the data includes an abnormality.

Thereby, data reading and writing can be performed with reliability on each of the duplicate IC cards 23-1 and 23-2.

In the above-described embodiment, the data is duplicated in the two IC cards 23-1 and 23-2. However, the data may be duplicated in each of three IC cards or more.

What is claimed is:

1. A recording medium control method for controlling access to a plurality of recording media each storing duplicated data, wherein:

each of the recording media stores identification information for identifying which of the recording media stores the duplicated data;

it is determined whether the data of the recording media are consistent with each other based on the identification information;

the access to the recording media is enabled if it is determined that the data of the recording media are consistent with each other; and the access to the recording media is inhibited if it is determined that the data of the recording media are inconsistent with each other.

2. The recording medium control method as claimed in claim 1, wherein each of the recording media stores, as the identification information, first identification information for self-identification and second identification information for identifying another of the recording media; and it is determined that there is data consistency between one of the recording media and the rest of the recording media if the first identification information of the one of the recording media exists as the second identification information in the rest of the recording media.

3. The recording medium control method as claimed in claim 1, wherein each of the recording media stores third identification information for identifying an apparatus in which the recording media are loaded; and the apparatus is enabled to control the recording media when the third identification information matches identification information of the apparatus.

4. A data management apparatus loaded with a plurality of recording media each storing duplicated data and controlling access to the loaded recording media, the data management apparatus comprising:

an access control part determining whether the duplicated data of the recording media are consistent with each other and controlling the access to the recording media based on a result of the determination, wherein:

each of the recording media stores identification information for identifying which of the recording media stores the duplicated data;

said access control part makes the determination based on the identification information; and said access control part enables the access to the recording media if said access control part determines that the data of the recording media are consistent with each other and inhibits the access to the recording media if said access control part determines that the data of the recording media are inconsistent with each other.

5. The data management apparatus as claimed in claim 4, wherein each of the recording media stores, as the identification information, first identification information for self-identification and second identification information for identifying another of the recording media; and said access control part determines that there is data consistency between one of the recording media and the rest of the recording media if the first identification information of the one of the recording media exists as the second identification information in the rest of the recording media.

6. The data management apparatus as claimed in claim 5, wherein each of the recording media stores third identification information for identifying the data management apparatus in which the recording media are loaded; and said access control part enables the data management apparatus to control the recording media when the third identification information matches identification information of the data management apparatus.

7. The data management apparatus as claimed in claim 4, wherein each of the recording media stores version information updated every time the data thereof is updated; and said access control part records the data of a first one of the recording media on a second one of the recording media so as to set the first and second recording media controllable if the version information of the first and second information media are different from each other, the version information of the first recording medium being updated more times than that of the second recording medium.

8. The data management apparatus as claimed in claim 7, further comprising a version number update part updating the version information of each of the recording media when the recording media are removed from the data management apparatus in which the recording media are loaded.

9. The data management apparatus as claimed in claim 4, wherein each of the recording media stores determination information for determining whether the recording medium is independently controllable; and said access control part recognizes the determination information of each of the recording media if said access control part determines that there is no data consistency between the recording media, and sets one of the recording media controllable if the determination information of the one of the recording media shows that the one of the recording media is independently controllable.

10. The data management apparatus as claimed in claim 4, wherein each of the recording media stores determination information for determining whether the recording medium is in use; and said access control part inhibits the access to the recording media if the determination information shows that at least one of the recording media is in use, and sets the recording media usable if the determination information shows that all of the recording media are unused.

11. The data management apparatus as claimed in claim 4, wherein each of the recording media stores determination information for determining whether the data recorded on the recording medium is valid or invalid; and said access control part inhibits the access to the recording media if the determination information of one of the recording media shows that the data recorded thereon is invalid.

12. The data management apparatus as claimed in claim 4, wherein each of the recording media has the data stored divided into a plurality of data blocks, and stores data identification information for identifying divided pieces of the data with corresponding data block identification information for identifying the data blocks storing the divided pieces of the data; and said access control part recognizes the data block identification information based on the data identification information and makes accessible one of the data blocks which one stores a required one of the divided pieces of the data based on the data block identification information.

13. The data management apparatus as claimed in claim 4, further comprising:

a monitoring part monitoring an abnormality in each of the recording media storing abnormal information indicating whether another of the recording media has the abnormality; and an information recording part recording information indicating occurrence of the abnormality in one of the recording media on the rest of the recording media as the abnormal information if the abnormality in the one of the recording media is detected.

14. A recording medium for recording data, comprising:

a plurality of data blocks for recording the data, the data blocks each comprising:

a data recording part recording a number of times the data is updated as number management information; and a recording control part moving the data stored in the data block to a next available one of the data blocks if the number management information reaches a preset given number of times.

\* \* \* \* \*